US012657255B1

(12) United States Patent
Lee

(10) Patent No.: US 12,657,255 B1
(45) Date of Patent: Jun. 16, 2026

(54) ELECTRONIC DEVICE FOR ON-DEVICE PROCESSING OF LARGE LANGUAGE MODELS

(71) Applicant: DEEPX CO., LTD., Seongnam-si (KR)

(72) Inventor: Ho Chul Lee, Gwangmyeong-si (KR)

(73) Assignee: DEEPX CO., LTD., Seongnam-si (KR)

(*) Notice: Subject to any disclaimer, the term of this patent is extended or adjusted under 35 U.S.C. 154(b) by 0 days.

(21) Appl. No.: 19/322,673

(22) Filed: Sep. 9, 2025

(30) Foreign Application Priority Data

Jun. 30, 2025 (KR) ........................ 10-2025-0087388

(51) Int. Cl.
| | |
|---|---|
| *G06F 17/16* | (2006.01) |
| *G06N 3/0475* | (2023.01) |
| *G06N 3/0495* | (2023.01) |
| *G10L 15/26* | (2006.01) |

(52) U.S. Cl.
CPC ........... G06F 17/16 (2013.01); G06N 3/0475 (2023.01); G06N 3/0495 (2023.01); *G10L 15/26* (2013.01)

(58) Field of Classification Search
CPC ............ G06F 17/16; G06F 2207/4824; G06N 3/02–04; G06N 3/0475; G06N 3/0495; G06N 3/06–063
See application file for complete search history.

(56) References Cited

U.S. PATENT DOCUMENTS

| | | | |
|---|---|---|---|
| 2019/0138882 A1 | 5/2019 | Choi et al. | |
| 2022/0357984 A1* | 11/2022 | Kotler | ..................... G06F 9/544 |
| 2025/0278615 A1* | 9/2025 | Son | ...................... G06N 3/0464 |
| 2025/0307627 A1* | 10/2025 | Son | ......................... G06N 3/063 |
| 2025/0322232 A1* | 10/2025 | Kim | ..................... G06N 3/0495 |
| 2025/0335782 A1* | 10/2025 | Kim | ..................... G06N 3/0495 |

FOREIGN PATENT DOCUMENTS

| | | | | |
|---|---|---|---|---|
| CN | 115545177 A | * | 12/2022 | ............. G06N 3/082 |
| KR | 10-2025-0002218 A | | 1/2015 | |
| KR | 10-2024-0098182 A | | 6/2024 | |

OTHER PUBLICATIONS

Lin, Ji, et al. "Awq: Activation-aware weight quantization for on-device llm compression and acceleration." Proceedings of machine learning and systems 6 (2024): 87-100. (Year: 2024).*

(Continued)

*Primary Examiner* — Matthew D Sandifer

(74) *Attorney, Agent, or Firm* — INVENSTONE PATENT, LLC

(57) ABSTRACT

A mobile electronic device may include a main memory for storing weight values of a compiled and quantized large language model, a processing core for performing an inference operation based on an attention mechanism on text based on the large language model, a controller for controlling the operation of the processing core and the main memory and for scheduling the inference operation, and a special function unit for performing vector operations and scalar operations necessary for the inference operation. Quantization and dequantization are performed in the inference operation of a large language model, enabling on-device inference operations with minimal performance degradation.

10 Claims, 21 Drawing Sheets

(56)    References Cited

OTHER PUBLICATIONS

Dettmers, Tim, et al. "Gpt3. int8 (): 8-bit matrix multiplication for transformers at scale." Advances in neural information processing systems 35 (2022): 30318-30332. (Year: 2022).*

Xiao, Guangxuan, et al. "Smoothquant: Accurate and efficient post-training quantization for large language models." International conference on machine learning. PMLR, 2023. (Year: 2023).*

Hooper, Coleman, et al. "Kvquant: Towards 10 million context length llm inference with kv cache quantization." Advances in Neural Information Processing Systems 37 (2024): 1270-1303. (Year: 2024).*

KR Office Action dated Feb. 23, 2026 issued on Application No. 10-2025-0087388.

* cited by examiner

1

S_CORE(620)

1 x N 1 x 1

S_FuncApx(1545)

| Operation | Energy(pj) |
|---|---|
| 8b INT Add | 0.03 |
| 16b INT Add | 0.05 |
| 32b INT Add | 0.1 |
| 16b FP Add | 0.4 |
| 32b FP Add | 0.9 |
| 8b INT Mult | 0.2 |
| 32b INT Mult | 3.1 |
| 16b FP Mult | 1.1 |
| 32b FP Mult | 3.7 |
| 32b SRAM Read (S_MEM) | 5 |
| 32b DRAM Read (M_MEM)(LPDDR RAM) | 640 |

Activation (Original)

Hard to quantize

ELECTRONIC DEVICE FOR ON-DEVICE PROCESSING OF LARGE LANGUAGE MODELS

CROSS-REFERENCE TO RELATED APPLICATIONS

This application claims the priority of Korean Patent Application No. 10-2025-0087388 filed on Jun. 30, 2025, in the Korean Intellectual Property Office, the disclosure of which is incorporated herein by reference.

BACKGROUND OF THE DISCLOSURE

Technical Field

The present invention relates to an electronic device for processing large language models.

Background Art

Humans possess intelligence that allows for functions such as recognition, classification, inference, prediction, and control/decision making. Artificial intelligence (AI) refers to the artificial imitation of human intelligence.

The human brain is composed of numerous nerve cells called neurons. Each neuron is connected to hundreds or thousands of other neurons through connections called synapses. A model that simulates the operating principles of biological neurons and the connections between them to imitate human intelligence is called a neural network (NN) model. That is, a neural network model is a system in which nodes imitating neurons are connected in a layer structure.

As neural network technology has advanced, the application of neural network inference services utilizing big data-based training has become increasingly diverse. These inference services can infer various and complex data through a model, where the inferred data is learned by training a neural network on a vast dataset. However, as the functionality and accuracy required for neural network inference services continue to increase, the parameter size, computational complexity, and memory bandwidth demands of neural network models are growing exponentially. Consequently, the performance requirements for processors and memory capable of supporting these inference tasks are also increasing. To address these demands, neural network inference services are increasingly being deployed on cloud computing-based servers that provide efficient processing capabilities for large-scale data operations.

Generative artificial intelligence models are increasingly being developed to operate in various environments. These models include various neural network models, including language models for conversational systems, stable diffusion models that generate images from text input, and transformer models that predict and determine future actions based on a series of events in a specific situation. The computational cost of generating a response to an input query based on these generative artificial intelligence models is very high. As one example, the commercialization of large language models (LLMs) among generative artificial intelligence models has become widespread.

Generative artificial intelligence models are very diverse, and new models are continuously being introduced to the market. Representative generative artificial intelligence models include, for example, GPT, LLaMA, DeepSeek, Mistral, DBRX, Qwen, Nova, Jamba, PaLM, PanGu, OPT, Gemini, Falcon, BLOOM, CLIP, RoBERTa, ALBERT, ELECTRA, LXNet, BERT, BART, CTRL, DALL E, Stable Diffusion, Midjourney, Imagen, DeepFloyd, Runway Gen, DreamBooth, StyleGAN, BigGAN, Sora, Pika Labs, Stable Video Diffusion, Imagen Video, Make-A-Video, Phenaki, Dreamix, VideoPoet, Text2Video-Zero, and CogVideo.

To provide these generative artificial intelligence services, high-performance hardware is essential. For example, implementing LLM services requires the use of high-performance general-purpose graphics processing units (GPGPUs) and high bandwidth memory (HBM). Furthermore, the total power consumption of GPGPUs operated worldwide to process these LLMs has reached a level comparable to the power consumption of an entire country, and this excessive energy demand is acting as a significant constraint on the commercialization of LLMs. Building a GPGPU-based data center to provide LLM services requires careful assessment of power plant capacity to determine whether the necessary energy can be supplied, and the difficulty of meeting the energy demands of these data centers in many urban areas can be a major barrier to the widespread deployment of large-scale AI models. Therefore, since current LLM services inevitably require high-specification hardware such as GPUs and HBM, it is not easy to implement artificial intelligence services utilizing LLMs on the device itself.

SUMMARY OF THE DISCLOSURE

Neural networks are classified as "single-layer neural networks" and "multi-layer neural networks" according to the number of layers. A general multi-layer neural network comprises an input layer, a hidden layer, and an output layer. (1) The input layer is the layer that accepts input values. The number of input layers is the same as the number of input variables. (2) The hidden layer is located between the input layer and the output layer and is a layer that receives signals from the input layer, extracts features, and transmits them to the output layer. (3) The output layer is a layer that receives signals from the hidden layer and outputs them to the outside.

To implement higher artificial intelligence, a deep neural network (DNN), which increases the number of hidden layers, has been disclosed. Among DNNs, a transformer artificial neural network is a DNN based on attention technology. The transformer utilizes numerous matrix multiplication operations. The transformer may obtain an operation value, the attention score (Q, K, V), using input values and parameters such as query Q, key K, and value V. The transformer may process various inference operations based on the operation value (e.g., the attention score (Q, K, V)). The transformer shows excellent performance in the field of generative artificial intelligence.

The transformer is utilized in various large language models. For example, a language model receives a query in text form and generates a response. The response generated by the language model may be generated by re-entering tokens, generated as part of the response from the language model, back into the language model. A transformer-based language model is fundamentally based on an attention mechanism, which involves numerous matrix multiplication (MatMul) operations. Large language models are fundamentally focused on performance and accuracy on the premise that they operate in data centers or the cloud. However, a neural processing unit implemented on-device has limitations in terms of memory capacity and processor performance, which must be overcome.

The problems of the present disclosure are not limited to the problems mentioned above, and other unmentioned problems will be clearly understood by those skilled in the art from the description below.

A mobile electronic device comprises a main memory for storing weight values of a compiled and quantized large language model; a processing core for performing an inference operation based on an attention mechanism on text based on the large language model; a controller for controlling the operation of the processing core and the main memory and for scheduling the inference operation; and a special function unit for performing vector operations and scalar operations necessary for the inference operation, wherein the main memory stores weight values of at least one artificial neural network corresponding to a weight matrix including a query weight matrix, a key weight matrix, or a value weight matrix for performing the attention mechanism, the weight values are pre-quantized when the artificial neural network is compiled, the processing core performs a matrix multiplication operation on an embedding vector of the text with the weight matrix under an N-bit integer system, where N is an integer and is the number of representation bits of the integer system used in the processing core, the special function unit includes a quantization unit for converting a value in a floating-point format to an integer format and a dequantization unit for converting a value in an integer format to a floating-point format, the weight values are quantized based on a first scale value determined when the artificial neural network is compiled and are prepared on the main memory before the inference operation, and during the inference operation, quantization for activation values may be performed based on a second scale value determined based on a range of activation values output from the artificial neural network.

An absolute value may be taken for at least a partial set of the entire weight values constituting the large language model, the maximum value among the obtained absolute values by $(2^{N-1})-1$ to obtain the first scale value, and a quantized value may be obtained by multiplying the weight value in floating-point format by the reciprocal of the first scale value.

The first scale value may be calculated on a per-channel basis of the artificial neural network or on a per-tile basis processed as a parallel operation unit in the processing core.

An absolute value may be taken for at least a partial set of activation values obtained during the inference operation, the maximum value among the obtained absolute values by $(2^{N-1})-1$ to obtain the second scale value, and a quantized value may be obtained by multiplying the activation value in floating-point format by the reciprocal of the second scale value.

The second scale value may be calculated on a per-channel basis of the artificial neural network or on a per-tile basis processed as a parallel operation unit in the processing core.

The processing core, the controller, and the special function unit may be included in a neural processing unit (NPU), and the main memory may be located outside the NPU. The matrix multiplication operation may be performed in the processing core under the N-bit integer system, and a softmax operation may be performed in the special function unit under an M-bit floating-point system, where M is an integer greater than N.

The dequantization unit may obtain a floating-point value by multiplying a quantized value by the first scale value and then multiplying the resulting value by the second scale value again.

The mobile electronic device may further comprise a non-volatile memory for storing the large language model, and the text and the inference result may be stored in the non-volatile memory.

The mobile electronic device may further comprise a microphone for receiving a voice signal from a user, a speech recognition module for converting the voice signal into the text, and a speaker for outputting the inference result.

The main memory may be an LPDDR5 with a capacity of 8 GB.

Other specific details of the examples are included in the detailed description and drawings.

By appropriately performing quantization and dequantization in the inference operation of a large language model, it is possible to enable on-device inference operations while minimizing performance degradation.

The effects according to the present disclosure are not limited by the contents exemplified above, and more diverse effects are included within the present disclosure.

DETAILED DESCRIPTION OF THE INVENTION

Figure 1:
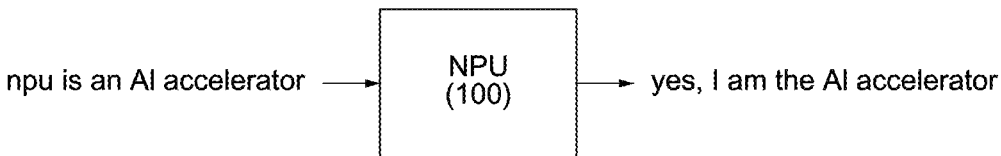
FIG. 1 is a block diagram illustrating a neural processing unit for processing a language model according to an example of the present disclosure.

Specific structural or functional descriptions of examples according to the concepts of the present disclosure are provided solely to illustrate such examples.

The present disclosure may be embodied in various forms and subject to modifications. Specific examples are shown in the drawings and described in detail, but are not intended to limit the disclosure to the particular forms illustrated. All changes, equivalents, and substitutes within the spirit and technical scope of the disclosure are encompassed.

Terms such as "first," "second," "primary," or "secondary" are used only to distinguish components and do not indicate order or importance. A first component may be referred to as a second component, and vice versa.

When a component is described as "connected" or "coupled" to another, the connection may be direct or indirect through one or more intervening components. "Directly connected" or "directly coupled" indicates no intervening component. Other expressions describing relationships between components, such as "~between~" and "~immediately between~" or "adjacent to~" and "directly adjacent to~," should be interpreted accordingly.

Expressions such as "A or B," "at least one of A and/or B," or "one or more of A and/or B" include all possible combinations: (1) at least one A, (2) at least one B, or (3) both.

Singular terms include the plural unless the context indicates otherwise. Technical and scientific terms have the meanings commonly understood by those skilled in the relevant art. Terms defined in general dictionaries are interpreted in the context of the relevant art and not in an idealized or overly formal sense, unless explicitly defined herein. In some cases, even explicitly defined terms are not interpreted to exclude other embodiments.

Terms such as "comprising" or "having" indicate the presence of stated features, elements, steps, or combinations thereof, without excluding additional features, elements, steps, or combinations.

Features of various examples may be used independently or in combination. The examples may be technically interlocked and operated in various ways.

Descriptions of well-known technical content not directly related to the present disclosure may be omitted to better convey its gist.

In the present disclosure, a "unit" may refer to a hardware module or a hardware circuit. For example, a "unit" may be a hardware circuit for performing a specific function. However, a "unit" does not necessarily mean a dedicated circuit physically separated from other circuits to perform only that function. A "unit" may be configured based on a plurality of circuits, and these circuits may exist in different locations and perform a specific function by interlocking under a control signal. For example, "unit A" and "unit B" may include at least some common electronic circuits.

In the present disclosure, an "artificial intelligence model" may include not only generative AI models but also traditional AI models that perform judgment, classification, prediction, and the like. An artificial intelligence model may include a language model, a model that reads images or videos, and the like, and any model that generates output data from input data using an artificial neural network may correspond to an artificial intelligence model. For example, an artificial intelligence model may generate output text from input text. An artificial intelligence model may classify input data or generate prediction data from input data. An artificial intelligence model may search for or track an object of interest from an image or video. An artificial intelligence model may perform situation judgment by analyzing an image or video. An artificial intelligence model may generate an image/video corresponding to input text based on the input text. An artificial intelligence model may generate output text describing an input image/video from the input image/video. The input data and output data may each be text, a voice signal, an image, a video, and the like, and are not limited in kind.

An artificial intelligence model may be implemented as an artificial neural network, and as a representative embodiment, the processing or operation of an artificial intelligence model may include various operations performed within the computation graph of a neural network. These operations may include not only layers including weight parameters (dense layers, convolutional layers, and the like) but also operations that have no parameters or a limited number of parameters, such as softmax and RMS normalization (RMS-Norm).

"Transformer" is an artificial intelligence model implemented based on an attention mechanism and may be used in language models such as a large language model (LLM) and/or a small language model (SLM). Language models include BERT (bidirectional encoder representations from transformers), GPT (generative pre-trained transformer), RoBERTa (robustly optimized BERT pretraining approach), ALBERT (a lite BERT), ELECTRA (efficiently learning an encoder that classifies token replacements accurately), transformer-XL (transformer with extra long context), XLNet (a model combining the advantages of GPT and BERT), BART (bidirectional and auto-regressive transformers), CTRL (conditional transformer language), T5 (text-to-text transfer transformer), LaMDA (language model for dialogue applications), Gopher (DeepMind's LLM), InstructGPT (a fine-tuned model based on GPT-3), PanGu (Huawei's Chinese model), PaLM (Pathways language model), OPT 175B (open pretrained transformer 175B), BLOOM (bigscience large open-science open-access multilingual model), Hyper-CLOVA (Naver's Korean super-large model), and the like, and may also include new language models that will appear in the future.

A transformer may be utilized not only in natural language processing (NLP) but also in computer vision, and representative transformer-based vision models include ViT (Vision transformer), Swin transformer (sliding window-based transformer for Vision), and the like.

According to examples of the present disclosure, a device, method, system, and computer-readable medium, and the like, that enable a generative artificial intelligence service to operate on the device itself (also referred to as on-device) may be provided.

Generally, a transformer-based generative artificial intelligence model receives a query and generates a response. For example, a language model receives a query in text form and generates a token. Then, the query and the generated token are input back into the language model to generate the next token. This token generation operation may be repeated several times until the response to the query is complete. A token may correspond to a word or part of a word. The response generated by the language model may include a series of tokens that are further generated by passing the tokens generated as part of the response from the language model back through the language model.

In this specification, "channel" refers to a set of output values generated by the same operation unit in the operation of an artificial neural network, and may correspond to, for example, the filter output of a convolutional neural network (CNN), the node output of a multilayer perceptron (MLP), or the hidden unit dimension ($d_{model}$) of a transformer-based model.

Hereinafter, an example of the present disclosure will be described in detail with reference to the accompanying drawings.

FIG. 1 illustrates a neural processing unit for processing a language model according to an example of the present disclosure.

Referring to FIG. 1, a computing system 1000 operates on an edge device and can infer input text data through embedding, attention, feed forward, softmax, and the like, to output one or more output tokens. This inference operation is composed of numerous matrix multiplication and nonlinear operations, and the neural processing unit (NPU) of the present disclosure enables high-speed inference through the optimization of these operations.

The computing system 1000 may receive input data and generate output data. Specifically, the computing system 1000 may include an NPU 100. The computing system 1000 may further include an operation unit such as a CPU, a GPU, and memory, in addition to the NPU 100. The embedding transformation for input text may be performed by a CPU or GPU, and the like. The transformed embedding vector is delivered to the NPU 100 and may be utilized for subsequent inference operations by the NPU 100. The NPU 100 may perform the inference operation of a transformer-based generative artificial intelligence model.

The NPU 100 may generate output data from input data. According to an example, the input data may be text data. The output data may be text data or image or video data. The text data is composed of at least one token. For example, if text including five tokens—'npu,' 'is,' 'an,' 'AI,' 'accelerator'—is input to the NPU 100, the NPU 100 may perform a transformer-based artificial neural network operation to output text including six tokens of 'yes,' 'I,' 'am,' 'an,' 'AI,' 'accelerator.'

The transformer-based artificial intelligence model operation may be performed in an on-device manner. That is, the computing system 1000 may be included and driven on an edge device such as a smartphone, camera, CCTV, robot, vehicle, drone, home appliance, artificial intelligence assistant, smart mobility, and the like. The edge device within the computing system 1000 does not require wired or wireless communication with the outside of the computing system 1000 for the artificial neural network operation.

The transformer-based artificial intelligence model operation may be performed based on an attention mechanism.

Under the attention mechanism, input data in text form is converted into an embedding vector through an embedding process, and the embedding vector may be converted into a query, key, and value (Q, K, V) vector using a matrix multiplication (MatMul) with a query weight matrix, a key weight matrix, and a value weight matrix. The query weight matrix, the key weight matrix, and the value weight matrix are each pre-learned values. Thereafter, the similarity of the query Q with the key K is calculated, and the similarity is converted into a normalized attention weight through a softmax function. An attention output may be obtained by multiplying the calculated weight by the value vector to assign a value V. The attention output may pass through a feedforward neural network, and the like to finally calculate the probability distribution of the next token, and the token with the highest probability may be determined as the final output token.

Figure 2:
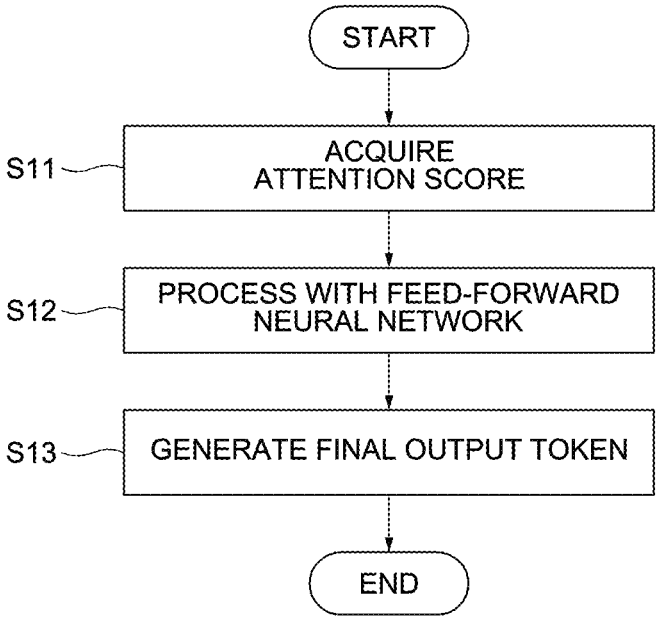
FIG. 2 is a flowchart illustrating a method for processing a language model using a neural processing unit according to an example of the present disclosure.

FIG. 2 illustrates a method for processing a language model using a neural processing unit according to an example of the present disclosure.

Referring to FIG. 2, in a step S11, the NPU 100 may obtain an attention score for the input data. Here, the input data may include a plurality of tokens, and each token may be represented by an embedding vector of a predetermined dimension ($d_{model}$). The number of dimensions of the embedding vector ($d_{model}$) may be, for example, 128, 256, 1024, 2048, or 4096. Hereinafter, for convenience of explanation, it is assumed in this embodiment that the number of dimensions of the embedding vector ($d_{model}$) is 4096. Accordingly, under the computing system 1000, one token may be represented by a 1×4096 dimensional embedding vector.

For example, if a user inputs "npu is an AI accelerator" composed of five tokens to the computing system 1000, the computing system 1000 may convert the corresponding input text into a 5×4096 (i.e., five 1×4096) size embedding vector, and the NPU 100 may receive the corresponding embedding vector.

The NPU 100 may obtain a query vector Q by matrix multiplying the embedding vector with a query weight matrix. The NPU 100 may obtain a key vector K by matrix multiplying the embedding vector with a key weight matrix. And the NPU 100 may obtain the similarity through the dot product between the query vector Q and the key vector K. By dot-multiplying the query vector Q and the key vector K, a scalar value is obtained, and as a result, a vector $Q^{KT}$ of a size (1×5) equal to the number of tokens in the input data is obtained. $Q^{KT}$ represents the similarity of the current token with the key k (each of the five tokens).

However, since the elements of the obtained vector $Q^{KT}$ can be numerically very large, for numerical stability, the final normalized similarity may be obtained by dividing $Q^{KT}$ by the square root of the size of the key vector K ($\sqrt{(dk)}$) and then applying a softmax operation. The following Equation 1 represents a formula for calculating a softmax-based similarity value ($q_k$) for the current token key k, in which the value of k may be one of 1, 2, . . . , N (where N is a natural number of two or more and represents the number of tokens included in the input data). In this embodiment, N=5.

Equation 1

$$q_k = softmax\left(\frac{QK^T}{\sqrt{d_k}}\right)$$

9

Here, the softmax operation is an operation that converts several numbers into probabilities between 0 and 1. The following Equation 2 represents a formula for performing a softmax operation on a vector $[z_1, z_2, \ldots, z_n]$.
Equation 2

$$\sigma(z_i) = \frac{e^{z_i}}{\sum_{j=1}^{n} e^{z_i}}$$

However, if a very large value exists in vector zi, a numerical instability problem may occur. To solve this, a numerically more stable calculation can be made possible by using a method of subtracting the maximum value $z_{max}$ (negative exponential trick). The following Equation 3 is a softmax operation formula modified from Equation 2 using the calculated $z_{max}$.
Equation 3

$$\sigma(z_i) = \frac{e^{z_i - z_{max}}}{\sum_{j=1}^{n} e^{z_i - z_{max}}}$$

Through Equation 1, the similarity can be obtained, for example, as a 1×5 size vector of [0.007, 0.993, 0, 0, 0]. The similarity is a value that the similarity of the current query (e.g., 'npu') to other tokens is expressed as a probability.

According to an embodiment, the NPU 100 may assign a value to the similarity. The method for calculating the value vector may be similar to the method for calculating the key vector. The embedding vector may be converted into a value vector through a matrix multiplication with a pre-learned value weight matrix. An attention score may be obtained by vector-matrix multiplying the similarity obtained through Equation 1 with the value vector V. Accordingly, an attention score of 5×4096 size, which is the same dimension as the input data, may be obtained by performing an operation such as Equation 4.
Equation 4

$$\text{Attention Score} = \text{softmax}\left(\frac{QK^T}{\sqrt{d_k}}\right) \times V$$

That is, the NPU 100 may repeatedly perform the operation of Equation 4 to generate output data. In this process, it can be seen that the NPU 100 repeatedly performs high-dimensional calculations including matrix multiplication, division, and multiplication operations. According to an embodiment, the NPU 100 may additionally perform a residual connection and layer normalization. The residual connection and layer normalization are for compensating for the possibility of gradient vanishing that can occur in the differentiation-based learning method of deep learning, and may minimize information loss by adding the input value to the output value that has passed through the layer of the artificial neural network. For the residual connection, after the attention score is calculated, the embedding vector of the input data may be added to the corresponding attention score. Layer normalization can alleviate the covariant shift in natural language processing by adjusting the value based on the mean and variance of the output value (i.e., the result of the residual connection).

After the step S11, the NPU 100 may process the attention score through a feed-forward neural network in a step S12. Here, the feed-forward neural network is for predicting nonlinear phenomena, and may infer the contextual meaning of phrases or clauses by recombining the relationship information of the tokens for which the attention score was calculated. The feed-forward neural network can, for example, use a fully connected hidden layer where two layers with 2,048 nodes are all connected, and the output may be a vector of the same 4,096 dimensions as the input. The feed-forward neural network may be pre-learned, and a matrix multiplication operation may be repeatedly performed for inference. The input data input to the feed-forward neural network is represented as a 4,096-dimensional vector as the result of passing through the residual connection and normalization in the step S11. The residual connection and normalization of the step S11 may also be additionally performed on the output data of the hidden layer composed of two layers.

After the step S12, the NPU 100 may generate the final output token in a step S13.

To generate the final output token, the output data from the step S12, the output vector, must be expanded to the number of the entire token set that can be processed by the language model (e.g., 30,000). For example, the output vector of step S12 may be expanded to a 1×30000 size logit vector by being matrix-multiplied with a final output weight matrix (e.g., 4,096×30,000). The size of the final output weight matrix for the final output is $d_{model} \times \text{SIZE\_DIC}$, where SIZE_DIC represents the total number of tokens that can be output from the language model being inferred in the NPU (in this embodiment, 30,000). A softmax operation is applied to the calculated 1×30,000 size logit vector, so that all 30,000 tokens are normalized to probability values between 0 and 1, and the token with the highest probability value among the 30,000 probability values may be selected as the next output token to be generated. For example, if the input data to the NPU 100 is 'npu is an AI accelerator,' the output token may be determined as 'yes'; and if the input data is 'npu is an AI accelerator yes you are an,' the output token may be determined as 'expert.'

As described above with reference to FIG. 1 and FIG. 2, the NPU 100 repeatedly performs numerous matrix multiplication (MatMul) operations, vector operations, and scalar operations for the inference operation of a transformer-based artificial neural network model, and the NPU 100 needs to be optimized for these operations. Hereinafter, the structure and operation of the NPU 100 will be described.

Figure 4:
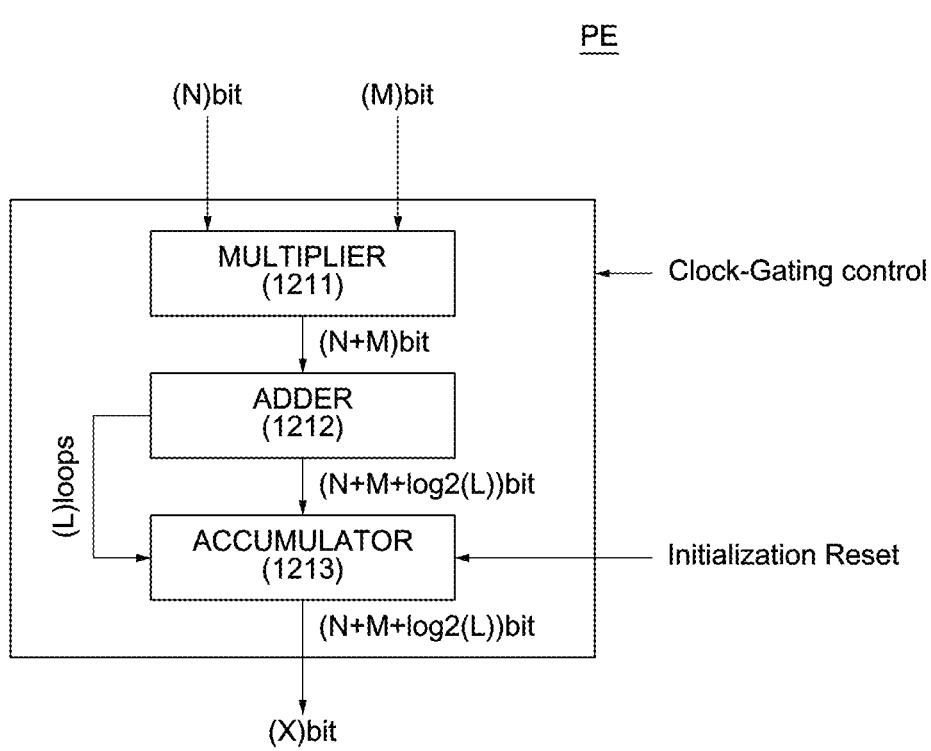
FIG. 4 is a block diagram illustrating a processing element according to examples of the present disclosure.

FIG. 4 illustrates a processing element (PE) according to examples of the present disclosure.

Referring to FIG. 4, a processing element PE may be configured to include a multiplier 1211, an adder 1212, and an accumulator 1213. The processing element PE of FIG. 4 may be one of a plurality of processing elements included in the processing core 300 of FIG. 3.

The multiplier multiplies the input (N)bit data and (M)bit data. The operation value of the multiplier is output as (N+M)bit data. Here, N and M are integers greater than zero. A first input unit may be configured to receive (N)bit data. A second input unit may be configured to receive (M)bit data. For example, the first input unit may be configured to receive an input parameter, and the second input unit may be configured to receive a weight value.

The bit width of the parameters input to the first input unit and the second input unit of the processing element PE may be determined when compiling the current neural network model processed by the NPU 100 to obtain an execution code. That is, the bit width of the input parameter and the bit width of the weight value of the neural network model may be determined in the compilation step by the compiler. For example, the input parameter and the weight value may be quantized to have the same bit width. Here, the bit width may be 32 bits, 16 bits, 8 bits, 4 bits, and the like, but the present disclosure is not limited thereto. For example, the bit width of the input parameter and the bit width of the weight value may be determined to be different from each other, and the parameters may be quantized based on their respective bit widths. For example, the bit width of the input parameter and the bit width of the weight value may be quantized to 16 bits and 8 bits, respectively. For example, the bit width of the input parameter and the bit width of the weight value may be quantized to 8 bits and 4 bits, respectively. That is, the bit width of the parameters input to each input unit of the processing element PE may be different from each other. The quantization information of the data input to each input unit of the processing element PE may be included in the execution code.

The accumulator accumulates the operation value of the multiplier and the operation value of the accumulator using the adder for (L)loops. Therefore, the bit width of the data of the output unit and the input unit of the accumulator may be output as (N+M+log 2(L))bit. Here, L is an integer greater than zero. When the accumulation is finished, an initialization reset signal may be input to initialize the data stored inside the accumulator to zero. The accumulator of the processing element PE is configured to maintain the accumulated value when zero-skipping is activated. Based on the maximum value that can be accumulated in the accumulator, the output data (X)bit may be set to a bit width that does not cause an overflow of the output data (X)bit. For example, the (X)bit may be from 16 bits to 64 bits.

Figure 3:
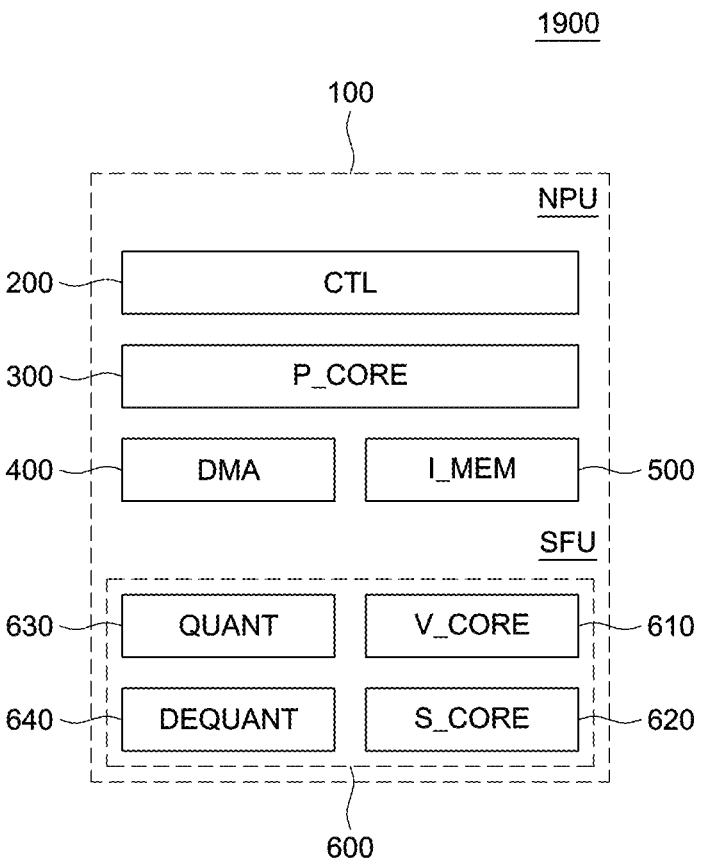
FIG. 3 is a block diagram illustrating a neural processing unit according to examples of the present disclosure.

To elaborate, referring to FIG. 3, the quantization unit 630 of the special function unit 600 may convert the integer parameters output from the processing core 300 into floating-point parameters and transmit them to the vector core 610, the scalar core 620, and/or the internal memory 500. The quantization unit 630 may be controlled under the control signal of the controller 200.

Figure 6:
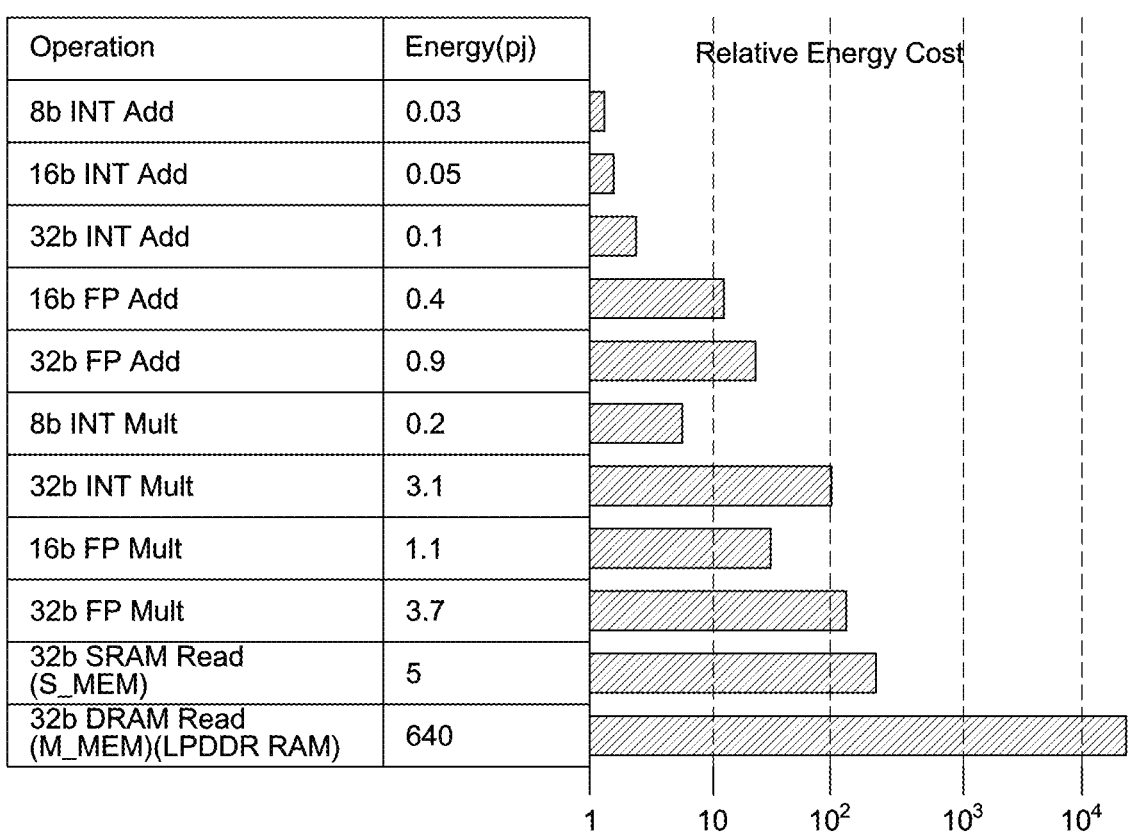
FIG. 6 is a table schematically illustrating the energy consumption per unit operation of a neural processing unit according to examples of the present disclosure.

The controller 200 may restrict the operation of the multiplier 1211 (e.g., a zero-skipping operation) so that it does not perform an operation when zero is input to one of the first input unit and the second input unit of the multiplier 1211, based on the fact that the operation result becomes zero even if no operation is performed. For example, when zero is input to one of the first input unit and the second input unit of the multiplier 1211 of the processing element PE, the multiplier 1211 may operate in a zero-skipping manner. For zero-skipping, each processing element PE included in the processing core 300 may be activated or deactivated, respectively. The controller 200 may provide a clock-gating control signal as an activation or deactivation signal to each processing element PE in clock-cycle units. When the processing element PE is deactivated, the multiplier 1211 is deactivated. Accordingly, the power consumed for the operation of the multiplier 1211 can be reduced. An example of the power consumption of the multiplier 1211 is shown in FIG. 6.

The processing element PE may be designed to receive a clock-gating control signal for zero-skipping operation control (i.e., activation or deactivation) from the controller 200. Specifically, the multiplier 1211 of the processing element PE may be designed to receive each clock cycle (pulse) of the clock-gating control signal for zero-skipping operation control from the controller 200. Alternatively, the processing element PE may be modified such that the adder 1212 is designed to receive the clock-gating control signal for zero-skipping operation control from the controller 200. Alternatively, the processing element PE may be modified such that each of the multiplier 1211 and the adder 1212 is designed to simultaneously receive the clock-gating control signal for zero-skipping operation control from the controller 200.

Figure 5A:
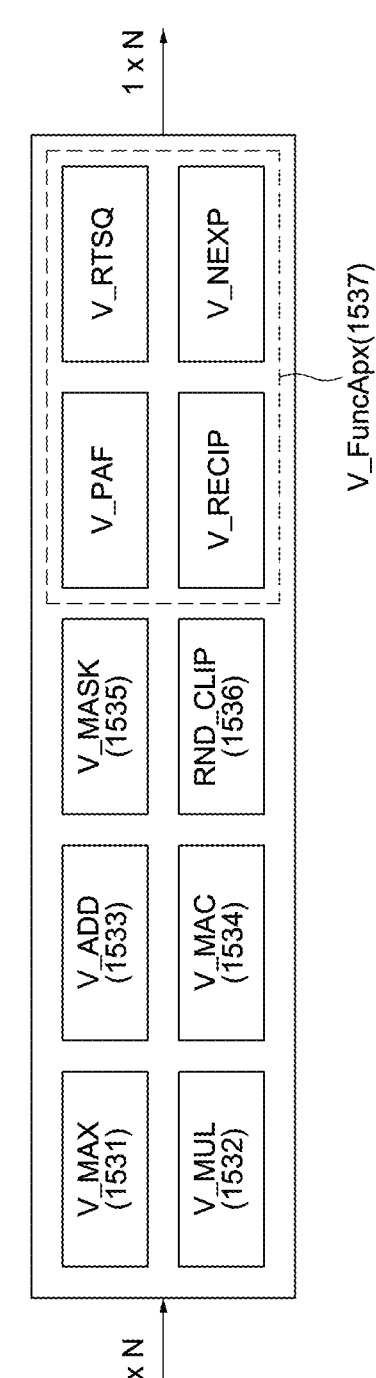
FIG. 5A is a block diagram illustrating a vector core of a special function unit that may be applied to examples of the present disclosure.

FIG. 5A illustrates a vector core 610 of a special function unit that may be applied to examples of the present disclosure.

Referring to FIG. 5A, the vector core 610 may refer to a collection of circuits that process a part of the operations of the artificial intelligence model, excluding the matrix multiplication processed in the processing core 300 of FIG. 3. The vector core 610 is different from the processing core 300 in that it is composed of floating-point operator circuits. That is, the vector core 610 may be configured to receive floating-point parameters and output floating-point parameters. The vector core 610 may be designed to be pipelined with the processing core 300 and the scalar core 620 for operational efficiency with the processing core 300 and the scalar core 620. To elaborate, the vector core 610 is configured to exchange data with the processing core 300, the scalar core 620, the internal memory 500, and the main memory (not shown in FIG. 3). To elaborate, the vector core 610 may be specially designed to efficiently process a part of the attention operation of a transformer-based neural network model. That is, the vector core 610 may include a plurality of specialized vector operation circuit units.

For example, the vector core 610 may be designed to include a vector maximum value operation unit 1531, a vector multiplication unit 1532, a vector addition unit 1533, a MAC operation unit 1534, a mask unit 1535, a rounding and clipping unit 1536, and a vector function approximation unit 1537. The vector maximum value operation unit 1531 is configured to include a circuit that processes a maximum value operation of the tensor data input to the vector core 610. The vector multiplication unit 1532 is configured to include a circuit that processes a multiplication operation of the tensor data input to the vector core 610. The vector addition unit 1533 is configured to include a circuit that processes an addition operation of the tensor data input to the vector core 610. The MAC operation unit 1534 is configured to include a circuit that processes a multiply-and-accumulate (MAC) operation of the tensor data input to the vector core 610. The mask unit 1535 is configured to include a circuit that processes a masking operation of the tensor data input to the vector core 610. The rounding and clipping unit 1536 is configured to include a circuit that processes rounding and clipping operations of the tensor data input to the vector core 610. The vector function approximation unit 1537 is configured to include a circuit that processes approximation operations of various functions of the vector core 610. The vector function approximation (V_FuncApx) unit will be described later.

For example, the vector core 610 may be a circuit designed to simultaneously process M×1 size tensor data. The vector core 610 may be designed to receive M×1 size tensor data and output M×1 size tensor data. Here, the M of the M×1 size tensor data received by the vector core 610 may be the same as the number of rows M of the M×N size tensor data received by the processing core 300. That is, a pipeline circuit design can be implemented by matching the size of a specific dimension of the tensor data of each of the processing core 300 and the vector core 610. To elaborate, the vector core 610 may include a register file for storing 1D array data. Therefore, the vector core 610 can improve the operation processing efficiency by processing the tensor data output from the processing core 300 in specific dimension units. As mentioned above, the vector core 610 is configured to process various function operations with a floating-point operator. Therefore, if the vector core 610 is designed to process the same tensor size as the processing core 300, the semiconductor chip size and power consumption of the NPU may increase. However, since the vector core 610 is designed to process data in a 1D array form, the increase in the semiconductor chip size of the NPU can be reduced, power consumption can be reduced, and the bottleneck phenomenon of neural network operations can be reduced by being pipelined with the processing core 300. In some examples, the vector core 610 may be designed to receive L×1 size tensor data. Here, L may be a power of two within a specific range based on M. For example, when M is 64, L can be 8, 16, 32, 64, 128, or 256.

Figure 5B:
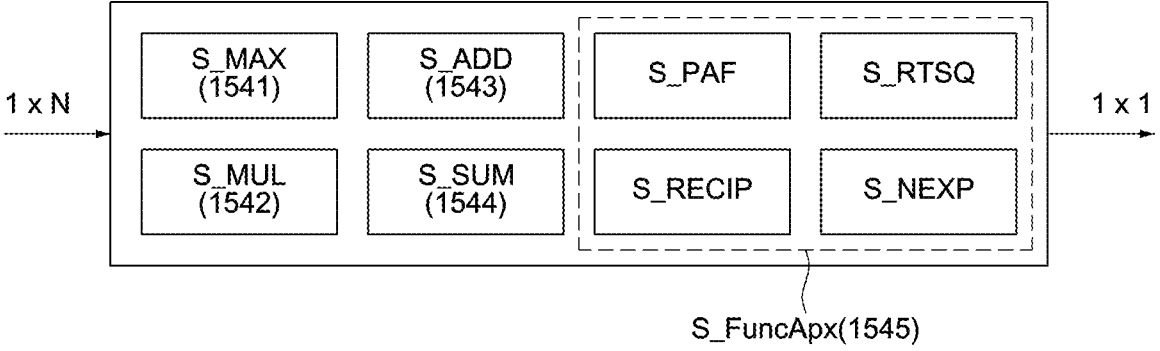
FIG. 5B is a block diagram illustrating a scalar core of a special function unit that may be applied to examples of the present disclosure.

FIG. 5B illustrates a scalar core 620 of a special function unit that may be applied to examples of the present disclosure.

Referring to FIG. 5B, the scalar core 620 may refer to a collection of circuits that process a part of the operations of the neural network model, excluding the operations processed in the processing core 300 and the vector core 610. The scalar core 620 is different from the processing core 300 in that it is composed of floating-point operator circuits. That is, the scalar core 620 may be configured to receive floating-point parameters and output floating-point parameters. The scalar core 620 may be designed to be pipelined with the processing core 300 and the vector core 610 for operational efficiency with the processing core 300 and the vector core 610. To elaborate, the scalar core 620 is configured to exchange data with the processing core 300, the vector core 610, the internal memory 400, and the main memory (not shown in FIG. 3). To elaborate, the scalar core 620 may be specially designed to efficiently process a part of the attention operation of a transformer-based neural network model. That is, the scalar core 620 may include a plurality of specialized scalar operation circuit units.

For example, the scalar core 620 may be designed to include a scalar maximum value operation unit 1541, a scalar multiplication unit 1542, a scalar addition unit 1543, a scalar summing unit 1544, and a scalar function approximation unit 1545. The scalar maximum value operation unit 1541 is configured to include a circuit that processes a maximum value operation of the tensor data input to the scalar core 620. The scalar multiplication unit 1542 is configured to include a circuit that processes a multiplication operation of the tensor data input to the scalar core 620. The scalar addition unit 1543 is configured to include a circuit that processes an addition operation of the tensor data input to the scalar core 620. The scalar summing unit 1544 is configured to include a circuit that processes a summing operation of the tensor data input to the scalar core 620. The scalar function approximation unit 1545 is configured to include a circuit that processes approximation operations of various functions of the scalar core 620. The scalar function approximation (S_FuncApx) unit will be described later.

For example, the scalar core 620 may be a circuit designed to simultaneously process M×1 size tensor data. The scalar core 620 may be designed to receive M×1 size tensor data and output 1×1 size tensor data. The scalar core 620 may be designed to receive M×1 size tensor data and output 1×1 size scalar data. Here, the M×1 size of the tensor data received by the scalar core 620 may be the same as the 1×N size received by the vector core 610. That is, a pipeline circuit design can be implemented by matching the size of a specific dimension of the tensor data of each of the vector core 610 and the scalar core 620. To elaborate, the scalar core 620 may include a register file for storing 1D array data. Therefore, the scalar core 620 can improve the operation processing efficiency by processing the tensor data output from the vector core 610 in specific dimension units. As mentioned above, the scalar core 620 is configured to process various function operations with a floating-point operator. Therefore, if the scalar core 620 is designed to process the same tensor size as the processing core 300, the semiconductor chip size and power consumption of the NPU may increase. However, since the scalar core 620 is designed to process data in a scalar form, the increase in the semiconductor chip size of the NPU can be reduced, power consumption can be reduced, and the bottleneck phenomenon of neural network operations can be reduced by being pipelined with the vector core 610.

In some examples, the scalar core 620 may be designed to receive L×1 size tensor data. Here, L may be a power of two within a specific range based on M. For example, when M is 64, L can be 8, 16, 32, 64, 128, or 256.

Hereinafter, the power consumption of the processing core 300, the vector core 610, and the scalar core 620 of the NPU 100 will be described with reference to FIG. 6.

FIG. 6 schematically illustrates the energy consumption per unit operation of a neural processing unit according to examples of the present disclosure.

Before explaining with reference to FIG. 6, energy consumption can be explained by dividing it into, for example, an addition operation and a multiplication operation. However, the energy consumed per unit operation may vary depending on the foundry process technology of the semiconductor chip (for example, 2 nm technology, 5 nm technology, 7 nm technology, 14 nm technology, 28 nm technology, and the like) or the technical capabilities of a specific foundry company.

The processing core 300 may be designed to operate on integer parameters of a specific bit width. In FIG. 6, the label "8b INT Add" means an 8-bit integer addition operation of the adder 1212 of the processing element PE. An 8-bit integer addition operation may consume 0.03 pJ of energy. The label "16b INT Add" means a 16-bit integer addition operation of the adder 1212 of the processing element PE. A 16-bit integer addition operation may consume 0.05 pJ of energy. The label "32b INT Add" means a 32-bit integer addition operation of the adder 1212 of the processing element PE. A 32-bit integer addition operation may consume 0.1 pJ of energy. The label "8b INT Mult" means an 8-bit integer multiplication operation of the multiplier 1211 of the processing element PE. An 8-bit integer multiplication operation may consume 0.2 pJ of energy. The label "32b INT Mult" means a 32-bit integer multiplication operation of the multiplier 1211 of the processing element PE. A 32-bit integer multiplication operation may consume 3.1 pJ of energy.

To elaborate, if the processing core 300 is composed of thousands to tens of thousands of processing elements designed as integer operators, the power consumption of the NPU 100 can be significantly reduced compared to when the processing core is composed of the same number of processing elements designed as floating-point operators. In general, in the case of a generative artificial intelligence model, since most of the operations are processed in the processing core 300, the design of an operator with a specific integer bit width is important for the low-power design of the NPU 100.

The vector core 610 and the scalar core 620 of the special function unit 600 may be designed to operate on floating-point parameters. Further in FIG. 6, the label "16b FP Add" means a 16-bit floating-point addition operation of the adder of the special function unit 600. A 16-bit floating-point addition operation may consume 0.4 pJ of energy. The label "32b FP Add" means a 32-bit floating-point addition operation of the adder of the special function unit 600. A 32-bit floating-point addition operation may consume 0.9 pJ of energy. The label "16b FP Mult" means a 16-bit floating-point multiplication operation of the multiplier of the special function unit 600. A 16-bit floating-point multiplication operation may consume 1.1 pJ of energy. The label "32b FP Mult" means a 32-bit floating-point multiplication operation of the multiplier of the special function unit 600. A 32-bit floating-point multiplication operation may consume 3.7 pJ of energy. To elaborate, if the special function unit 600 is designed with floating-point operators, it is advantageous in terms of the power consumption of the NPU 100 and the miniaturization of the semiconductor chip size to design the number of operators of the special function unit 600 to be smaller than the number of processing elements PE of the processing core 300. Therefore, the number of floating-point operators of the special function unit 600 may be designed to be smaller than the number of integer operators of the processing core 300.

According to an embodiment, the operational efficiency of the NPU 100 can be improved by implementing a data pipeline circuit design of the processing core 300, the vector core 610, and the scalar core 620 so that the array size of a specific dimension of the tensor data processed by the NPU 100 is compatible with each other among the hardware components.

Figure 7:
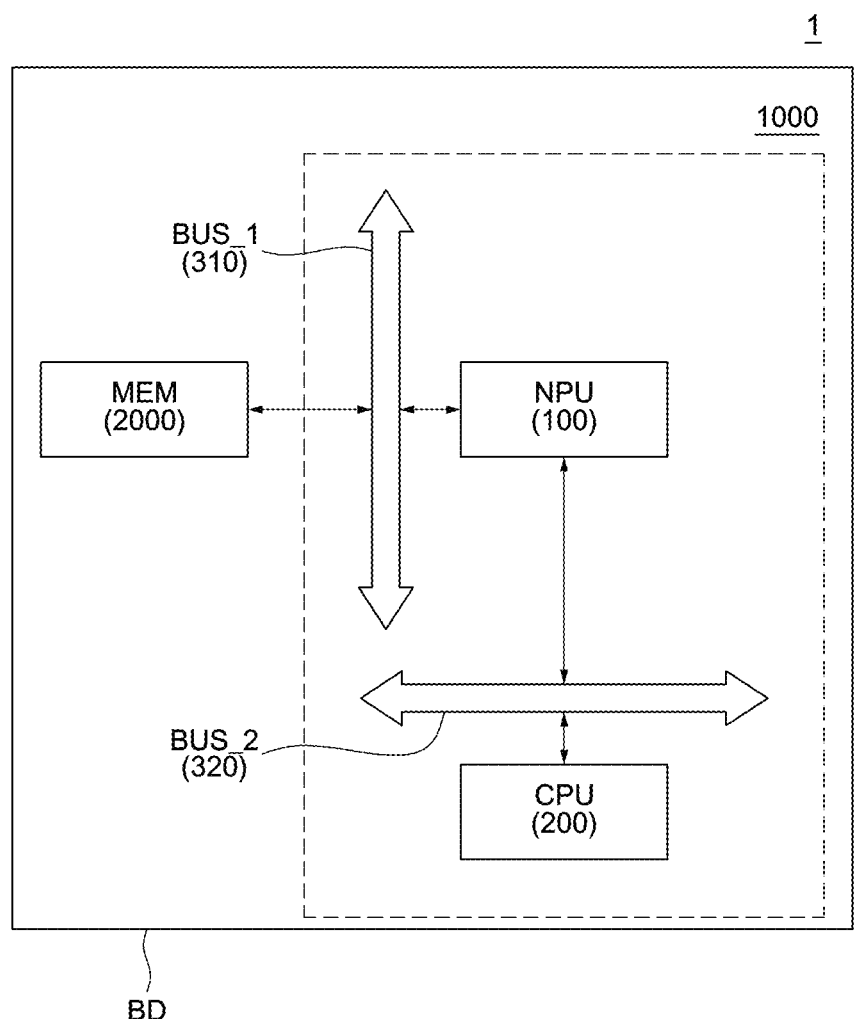
FIG. 7 is a block diagram illustrating a system on chip technology according to a first embodiment of a first example of the present disclosure.

FIG. 7 illustrates a system-on-chip technology according to a first embodiment of a first example of the present disclosure. A device 1 according to the first embodiment of the first example of the present disclosure will be described with reference to FIG. 7.

Referring to FIG. 7, the device 1 includes a circuit board BD, a memory 2000, and a system on chip 1000. The memory 2000 and the system on chip 1000 may be disposed on a circuit board (not shown). The system on chip 1000 is configured to include a neural processing unit (NPU) 100, a central processing unit (CPU) 200, a first bus 310, and a second bus 320. The memory 2000 is configured to be electrically connected to the first bus 310. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The NPU may be configured to communicate with the memory 2000. The first bus 310 may be provided between the NPU and the memory 2000. For example, the first bus 310 may be an advanced extensible interface (AXI) bus. However, the examples of the present disclosure are not limited thereto. The first bus 310 may be configured to support a read and write address/control interface for the memory 2000 and the NPU. The first bus 310 may be configured as an independent data communication channel to support high-speed data transmission through transaction processing other than memory control commands. The first bus 310 may be configured as a dedicated bus for transmitting input parameters, output parameters, and weight values of a neural network model, and it is desirable to appropriately design the bandwidth of the first bus 310 considering the parameter size of the neural network models to be processed.

The NPU 100 may be configured to communicate with the CPU 200. The second bus 320 may be provided between the NPU 100 and the CPU 200. For example, the second bus 320 may be an advanced high-performance bus (AHB). However, the examples of the present disclosure are not limited thereto. The second bus 320 may be provided for efficient communication between the NPU 100, the CPU 200, and peripheral devices of the system on chip 1000. The second bus 320 may provide a master-slave architecture to improve data throughput. The second bus 320 may be configured to support burst transmission and pipeline operation tasks of the system on chip 1000. The second bus 320 may be configured to provide an on-the-fly (OTF) function. The second bus 320 may be configured to allow a master of the second bus 320 to execute a new command on-the-fly, without waiting, while the CPU 200 or the NPU 100 is reading or writing data in real time. Therefore, the real-time data processing of the NPU 100 may be optimized, and at least one core of the NPU 100 may be configured to use the bus independently. Therefore, the second bus 320 may support the system on chip 1000 to perform various commands in real time.

To elaborate, the first bus 310 provides a higher memory bandwidth than the second bus 320, and the second bus 320 provides an on-the-fly function, thereby allowing the CPU to dynamically control the NPU 100. Accordingly, the system on chip 1000 can dynamically process various input queries for a generative neural network model.

The NPU 100 is described with reference to FIG. 3 to FIG. 6. Accordingly, redundant description may be omitted.

The CPU 200 may be configured to control the NPU 100 based on the execution code of an artificial intelligence model. The execution code may be generated by a compiler (not shown). The CPU 200 may control the NPU 100 by directly setting the register values of each circuit of the NPU 100 based on the execution code. Here, the execution code may include each register value. In addition, the CPU 200 may off-load and process operations that are not processed by the NPU 100. In this case, the neural network model may be compiled to off-load a specific operation of the neural network model to the CPU 200, and an execution code may be obtained.

The memory 2000 may include a main memory located outside the system on chip 1000, but is not limited thereto. The memory 2000 may be electrically connected to the system on chip 1000 through the first bus 310. The memory 2000 of the device 1 according to the first embodiment of the first example of the present disclosure may include at least one memory such as SRAM, LPDDR RAM, resistive RAM, magneto-resistive RAM, phase-change RAM, ferroelectric RAM, flash memory, HBM, and the like. The memory 2000 may be composed of at least one memory unit (for example, a bank, and the like). The memory MEM may be composed of a single (homogeneous) memory or a heterogeneous memory. It is desirable that the capacity of the memory 2000 is provided to be larger than the total size of the weight values of the neural network model. In this case, all of the weight values of the neural network model may be loaded and reside in the memory 2000 at once. If the storage capacity of the memory 2000 is insufficient, only a part of the weight values may be loaded, which may make it difficult to quickly process the inference operation of the neural network model in real time. For example, the capacity of the memory 2000 may be from 4 GByte to 8 GByte and may be determined considering the parameter size of the neural network model to be driven in the system on chip 1000.

The bandwidth of the first bus 310 may be determined according to the processing performance (e.g., tera operations per second or TOPS) of the NPU 100. For example, a memory bandwidth of 2 GB/s to 4 GB/s per 1 TOPS may be required for the memory 2000. For example, a 10 TOPS NPU may be configured with a memory to provide a bus bandwidth of 20 GB/s to 40 GB/s. The bandwidth of the first bus 310 may be determined according to the operating frequency of the memory 2000 and the number of communication channels. For example, to configure a memory bandwidth of 40 GB/s with LPDDR5, the following Equation 5 may be used Equation 5

$$\text{Memory Bandwidth (GB/s)}=(\text{Data Rate (Gbps per pin)} \times \text{Bus Width (bits)} \times \text{Number of Channels} \div 8).$$

To elaborate, LPDDR5 generally supports a data rate of up to 6400 Mbps per pin. The bus width of an LPDDR channel is generally 16 bits (2 bytes). Here, the number of channels must be an integer—that is, the number can have no significant digits beyond a decimal point. However, the examples of the present disclosure are not limited to the bandwidth of the first bus 310.

The device 1 according to the first embodiment of the first example of the present disclosure may be configured to provide a low-power function for use on-device.

The low-power mode of the device 1 according to the first embodiment of the first example of the present disclosure may be provided with, for example, a sleep mode, a deep sleep mode, a retention mode, and the like. In some examples, the low-power mode may be referred to as a standby mode, a hibernation mode, an idle mode, and the like.

The sleep mode may be implemented, for example, by applying clock gating to at least one of the processing core 300, the vector core 610, and the scalar core 620 of the NPU 100.

The deep sleep mode may be implemented, for example, by applying power gating to at least one of the processing core 300, the vector core 610, the scalar core 620 of the NPU 100, or the memory 2000.

The retention mode may be implemented by supplying a minimum retention voltage to the controller 200 of the NPU 100 or the memory 2000.

For example, the NPU 100 of the device 1 according to the first embodiment of the first example of the present disclosure may be configured to provide at least one of a power gating function, a clock gating function, and a register retention function. To elaborate, when the device 1 enters sleep mode, the NPU 100 may activate the clock gating function; when the device 1 enters deep sleep mode, the NPU 100 may activate the power gating function; and when the device 1 enters retention mode, the supply voltage input to the NPU 100 may be reduced or the operating frequency may be reduced.

For example, the memory 2000 of the device 1 according to the first embodiment of the first example of the present disclosure may provide at least one of a deep sleep function, a retention function, and a maintain parameters function. To elaborate, when the device 1 enters deep sleep mode, the memory 2000 may be power-gated, and in the case of a volatile memory device, data may be lost; when the device 1 enters retention mode, the supply voltage input to the memory 2000 may be reduced or the operating frequency may be reduced, and in the case of a volatile memory device, data may be maintained; and when the device 1 enters a maintain parameters mode, the supply voltage input to the memory 2000 may be reduced or the operating frequency may be reduced, and in the case of DRAM, the refresh period of the memory cells may be increased, so that data may be maintained in the case of a volatile memory device.

The low-power mode may be activated when an input query for speculative decoding is not input to the device 1 for a certain period of time or more. The certain period of time may be provided based on, for example, a timer, a counter value, and the like. The low-power mode may be activated based on a specific threshold time and may be deactivated when an input query processed by speculative decoding is input to the device 1. The state in which the low-power mode is deactivated may be referred to as a wake-up state.

The device 1 according to the first embodiment of the first example of the present disclosure may be a device operable in a battery environment. Therefore, the NPU 100 may be designed to be operable with a battery voltage.

The device 1 according to the first embodiment of the first example of the present disclosure may be configured to provide at least one low-power mode and simultaneously provide speculative decoding in an on-device environment. The device 1 may enter a low-power mode based on a preset condition, and accordingly, the power consumption of the device 1 may be reduced.

The system on chip 1000 according to the first embodiment of the first example of the present disclosure has the effect of being able to rapidly accelerate the inference operation of a generative neural network model with low power by the pipeline circuit structure of the processing core 300, the vector core 610, and the scalar core 620.

Figure 8:
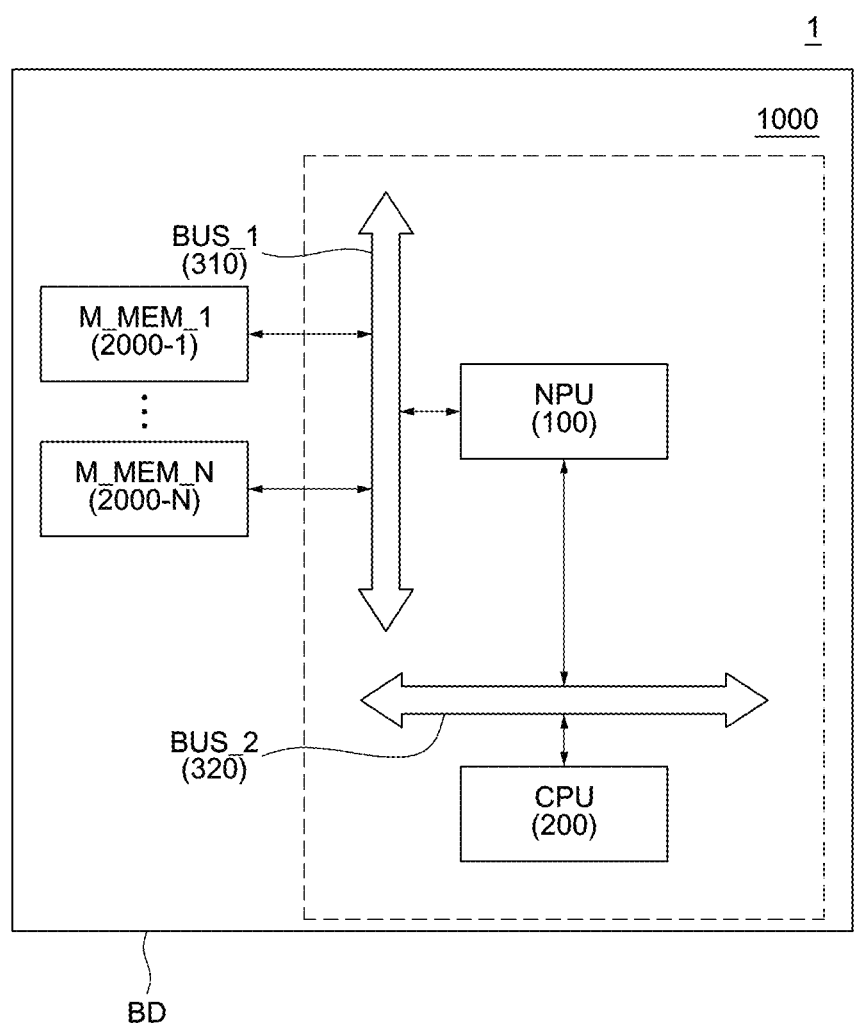
FIG. 8 is a block diagram illustrating a system on chip technology according to a second embodiment of the first example of the present disclosure.

FIG. 8 illustrates a system on chip technology according to a second embodiment of the first example of the present disclosure. A device 1 according to the second embodiment of the first example of the present disclosure will be described with reference to FIG. 8.

Referring to FIG. 8, the device 1 includes a circuit board BD, a plurality of main memories 2000-1~2000-N, and a system on chip 1000. In describing the device 1 according to the second embodiment of the first example of the present disclosure, overlapping descriptions with those explained with reference to FIG. 3 to FIG. 7 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the second embodiment of the first example of the present disclosure is configured to include a neural processing unit (NPU) 100, a central processing unit (CPU) 200, a first bus 310, and a second bus 320. The plurality of main memories 2000-1~2000-N are configured to be electrically connected to the first bus 310. The plurality of main memories 2000-1~2000-N are configured to include a plurality of semiconductor chips.

A first bus 310 may be provided between the NPU 100 and the plurality of main memories 2000-1~2000-N. A second bus 320 may be provided between the NPU 100 and the CPU 200.

Since the operation of the NPU 100 has been described above with reference to FIG. 3 to FIG. 6, a detailed description of NPU operation may be omitted. Since the operation of the CPU 200 has been described above with reference to FIG. 7, a detailed description of CPU operation may be omitted.

The plurality of main memories 2000-1~2000-N may be configured as a plurality of memories disposed outside the system on chip 1000. However, the present disclosure is not limited thereto. The plurality of main memories 2000-1~2000-N may each be electrically connected to the system on chip 1000 through the first bus 310. Each of the plurality of main memories 2000-1~2000-N of the device 1 according to the second embodiment of the first example of the present disclosure may include SRAM, LPDDR RAM, resistive RAM, magneto-resistive RAM, phase-change RAM, ferro-electric RAM, flash memory, or HBM, and the like. The plurality of main memories 2000-1~2000-N may be configured as a single (homogeneous) memory or a heterogeneous memory.

It is desirable that the total capacity of the plurality of main memories 2000-1~2000-N is larger than the total capacity occupied by the weight values of the artificial intelligence model. In this case, the weight values of the neural network model may be loaded and reside on the plurality of main memories 2000-1~2000-N at once. If the storage capacity of the plurality of main memories 2000-1~2000-N is insufficient, it may be difficult to quickly process the inference operation of the neural network model in real time. For example, the total capacity of the plurality of main memories 2000-1~2000-N may be one of 8 GByte, 16 GByte, 32 GByte, 64 GByte, and 128 GByte. That is, the total capacity of the plurality of main memories 2000-1~2000-N may be from 8 GByte to 128 GByte and may be determined considering the parameter size of at least one artificial intelligence model to be driven in the system on chip 1000. Therefore, by placing a plurality of main memories for loading and storing the parameters of the artificial intelligence model outside the system on chip 1000, the device 1 can easily increase the capacity of the main memory while reducing the manufacturing cost of the system on chip 1000. If a plurality of main memories are placed inside a package that protects the system on chip 1000, the size of the package may increase, leading to an increase in manufacturing cost, but it may satisfy the criteria of a specific form factor (for example, M.2 2230, M.2 2242).

The bandwidth of the first bus 310 may be determined according to the processing performance (e.g., tera operations per second or TOPS) of the NPU 100. For example, for a 30 TOPS NPU, the plurality of main memories 2000-1~2000-N may be configured to provide a bus bandwidth of 60 GB/s to 120 GB/s. The bandwidth of the first bus 310 may be determined according to the operating frequency of the plurality of main memories 2000-1~2000-N and the number of communication channels. However, the examples of the present disclosure are not limited to the bandwidth of the first bus 310.

The device 1 according to the second embodiment of the first example of the present disclosure provides a plurality of main memories 2000-1~2000-N, and the total capacity of the main memories may be a capacity capable of storing all parameters of at least one neural network model at once. In addition, according to the configuration of the second embodiment of the first example, the memory capacity can be expanded to correspond to the size of a generative neural network model with a considerable size of weight values. Therefore, the system on chip 1000 can process the neural network model quickly in real time. To elaborate, the plurality of main memories 2000-1~2000-N of the device 1 according to the embodiments of the present disclosure are configured as a dedicated memory for the system on chip 1000. If not all parameters of the artificial intelligence model processed by the NPU are stored in the plurality of main memories 2000-1~2000-N, especially if all weight values and attention scores cannot be stored in the plurality of main memories 2000-1~2000-N, the parameters must be stored in a separate storage device, which causes a decrease in operation speed due to large-capacity memory operations.

Figure 9:
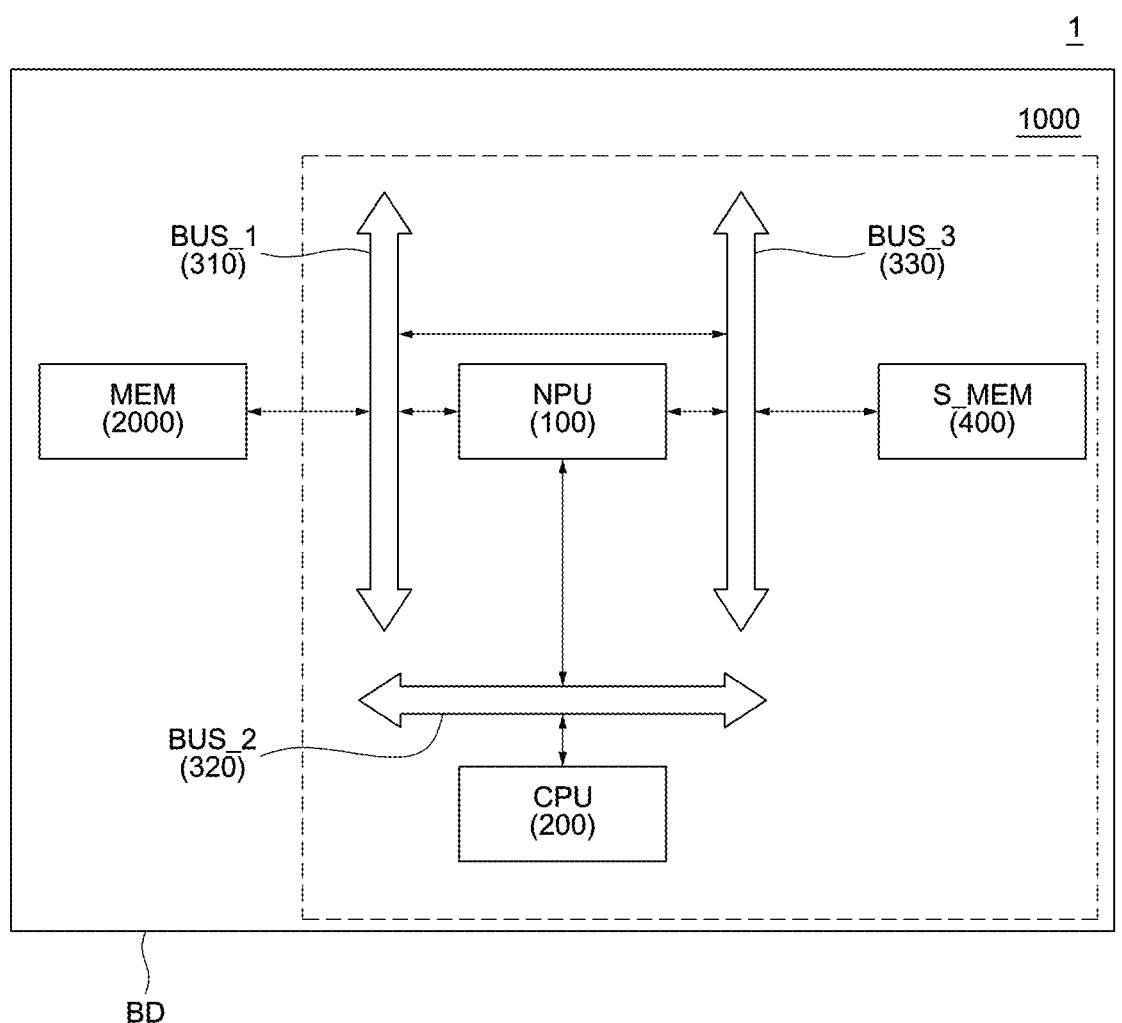
FIG. 9 is a block diagram illustrating a system on chip technology according to a third embodiment of the first example of the present disclosure.

FIG. 9 illustrates a system on chip technology according to a third embodiment of the first example of the present disclosure. A device 1 according to the third embodiment of the first example of the present disclosure will be described with reference to FIG. 9.

Referring to FIG. 9, the device 1 includes a circuit board BD, a main memory 2000, and a system on chip 1000. In describing the system on chip 1000 according to the third embodiment of the first example of the present disclosure, overlapping descriptions with those explained with reference to FIG. 3 to FIG. 8 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the third embodiment of the first example of the present disclosure is configured to include a neural processing unit (NPU) 100, a central processing unit (CPU) 200, a first bus 310, a second bus 320, a third bus 330, and a shared memory 400. The shared memory 400 is configured as an on-chip memory of the system on chip 1000. The main memory 2000 is configured to be electrically connected to the first bus 310. The main memory 2000 is configured to include at least one semiconductor chip. The shared memory 400 is configured to be electrically connected to the third bus 330.

The first bus 310 may be located between the NPU 100 and the main memory 2000. The second bus 320 may be located between the NPU and the CPU. The third bus 330 may be located between the NPU 100 and the shared memory 400. For example, the third bus 330 may be an advanced extensible interface (AXI) bus. However, the examples of the present disclosure are not limited thereto. The third bus 330 may be configured to support a read and write address/control interface for the shared memory 400 and the NPU 100. The third bus 330 may be configured as an independent data communication channel to support high-speed data transmission through transaction processing other than memory control commands. The third bus 330 may be configured as a dedicated bus for transmitting input parameters, output parameters, and weight values of a neural network model. Here, the first bus 310 and the third bus 330 are configured to be electrically connected. Accordingly, the shared memory 400 and the main memory 2000 may transmit tensor data through the first bus 310 and the third bus 330.

Since the operation of the NPU 100 has been described above with reference to FIG. 3 to FIG. 6, its detailed description may be omitted. Since the operation of the CPU has been described above with reference to FIG. 7, its detailed description may be omitted.

The main memory 2000 may be configured as at least one memory disposed outside the system on chip 1000. The main memory 2000 may be configured as a single (homogeneous) memory or a heterogeneous memory. The capacity of the main memory 2000 may be determined considering the parameter size of at least one neural network model to be driven in the system on chip 1000. The bandwidth of the first bus 310 may be determined based on the processing performance of the NPU 100.

The shared memory 400 may be configured as at least one memory disposed inside the system on chip 1000. The shared memory 400 of the system on chip 1000 according to the third embodiment of the first example of the present disclosure may include at least one memory such as SRAM, LPDDR RAM, resistive RAM, magneto-resistive RAM, phase-change RAM, ferroelectric RAM, flash memory, HBM, and the like. The shared memory 400 may be configured as a single (homogeneous) memory or a heterogeneous memory. As a representative embodiment, the shared memory 400 may be implemented with SRAM. The capacity of the shared memory 400 is designed to be smaller than the capacity of the main memory 2000. If the capacity of the shared memory 400 increases, the semiconductor manufacturing cost may increase rapidly. Therefore, the capacity of the shared memory 400 may be configured from 4 MByte to 128 MByte. Preferably, the capacity of the shared memory 400 may be configured from 16 MByte to 64 MByte. The capacity of the shared memory 400 may be larger than the capacity of the internal memory 500 of the NPU 100.

The operation of the shared memory 400 and the main memory 2000 will be described with reference to FIG. 6. In FIG. 6, the label "32b DRAM Read" means a 32-bit data read operation of the main memory 2000. Here, the main memory 2000 may be LPDDR RAM. In this case, a 32-bit data read operation of the main memory 2000 may consume 640 pJ of energy. The label "32b SRAM Read" means a 32-bit data read operation of the shared memory 400. Here, the shared memory 400 may be SRAM. In this case, a 32-bit data read operation of the shared memory 400 may consume 5 pJ of energy. That is, when the NPU 100 uses the shared memory 400 implemented with SRAM, the energy consumption of the device 1 can be significantly reduced compared to the case of using only the main memory 2000. However, since the manufacturing cost of the shared memory 400 is high, it is difficult to implement it with a large capacity. Therefore, when the compiler (not shown) generates the execution code of the neural network model to be processed by the system on chip 1000, it can set reusable input parameters, output parameters, and weight values to be preferentially stored in the shared memory 400 rather than the main memory 2000. That is, the compiler (not shown) can provide a function of determining reusable parameters during a series of neural network model operations and storing them in the shared memory 400 for reuse.

The system on chip 1000 according to the third embodiment of the first example of the present disclosure provides a shared memory 400, and by executing an execution code set to store reusable parameters in the shared memory 400, the power consumption of the system on chip 1000 can be reduced.

Figure 10:
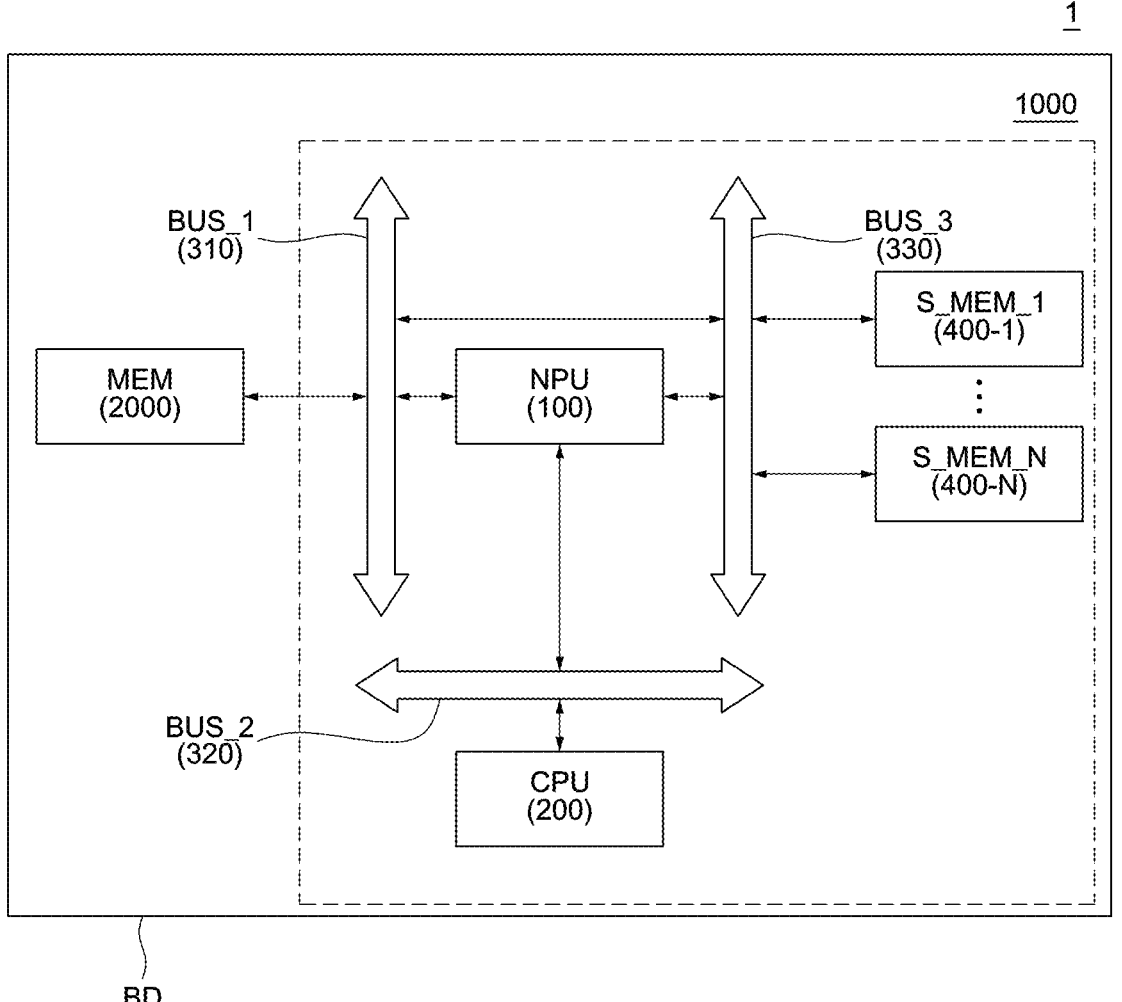
FIG. 10 is a block diagram illustrating a system on chip technology according to a fourth embodiment of the first example of the present disclosure.

FIG. 10 illustrates a system on chip technology according to a fourth embodiment of the first example of the present disclosure. A device 1 according to the fourth embodiment of the first example of the present disclosure will be described with reference to FIG. 10.

Referring to FIG. 10, the device 1 includes a circuit board BD, a main memory 2000, and a system on chip 1000. In describing the system on chip 1000 according to the fourth embodiment of the first example of the present disclosure, overlapping descriptions with those in FIG. 3 to FIG. 9 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the fourth embodiment of the first example of the present disclosure is configured to include a neural processing unit (NPU) 100, a central processing unit (CPU) 200, a first bus 310, a second bus 320, a third bus 330, and a plurality of shared memories 400-1~400-N. The plurality of shared memories 400-1~400-N are configured as on-chip memories of the system on chip 1000. The main memory 2000 is configured to be electrically connected to the first bus 310. The main memory 2000 is configured to include at least one semiconductor chip. The plurality of shared memories 400-1~400-N are configured to be electrically connected to the third bus 330.

A first bus 310 may be located between the NPU 100 and the main memory 2000. A second bus 320 may be located between the NPU 100 and the CPU 200. A third bus 330 may be located between the NPU 100 and the plurality of shared memories 400-1~400-N. Here, the first bus 310 and the third bus 330 are configured to be electrically connected.

Since the operation of the NPU has been described with reference to FIG. 3 to FIG. 6, a duplicate description of NPU operation may be omitted. Since the operation of the CPU has been described with reference to FIG. 7, a duplicate description of CPU operation may be omitted.

The main memory 2000 may be configured as at least one memory disposed outside the system on chip 1000. The main memory 2000 may be configured as a single (homogeneous) memory or a heterogeneous memory. The capacity of the main memory 2000 may be determined considering the parameter size of at least one neural network model to be driven in the system on chip 1000. The bandwidth of the first bus 310 may be determined according to the processing performance of the NPU 100.

The plurality of shared memories 400-1~400-N may be configured as a plurality of memories disposed inside the system on chip 1000. Each shared memory may be configured to operate independently of each other. The plurality of shared memories 400-1~400-N of the system on chip 1000 according to the fourth embodiment of the first example of the present disclosure may include at least one memory such as SRAM, LPDDR RAM, resistive RAM, magneto-resistive RAM, phase-change RAM, ferroelectric RAM, flash memory, HBM, and the like. The plurality of shared memories 400-1~400-N may be configured as a single (homogeneous) memory or a heterogeneous memory. Here, an example that the plurality of shared memories 400-1~400-N are implemented with SRAM is described. The capacity of the plurality of shared memories 400-1~400-N is designed to be smaller than the capacity of the main memory 2000. If the capacity of the plurality of shared memories 400-1~400-N increases, the semiconductor manufacturing cost may increase rapidly. Therefore, the total capacity of the plurality of shared memories 400-1~400-N may be configured from 4 MByte to 128 MByte. Preferably, the total capacity of the plurality of shared memories 400-1~400-N may be configured from 16 MByte to 64 MByte. The capacity of the plurality of shared memories 400-1~400-N may be configured to be larger than the capacity of the internal memory 500 of the NPU 100.

When the NPU 100 uses the plurality of shared memories 400-1~400-N implemented with SRAM, the energy consumption of the device 1 can be significantly reduced compared to the case of using only the main memory 2000. Therefore, when the compiler (not shown) generates the execution code of the neural network model to be processed by the system on chip 1000, it can set a data reuse command to preferentially store reusable input parameters, output parameters, and weight values in the plurality of shared memories 400-1~400-N located inside the system on chip 1000 rather than the main memory 2000.

The system on chip 1000 according to the fourth embodiment of the first example of the present disclosure provides a plurality of shared memories 400-1~400-N, and by executing an execution code set to preferentially store reusable parameters in the plurality of shared memories 400-1~400-N, the power consumption of the system on chip 1000 can be reduced. In addition, by providing a plurality of independent shared memories for their respective domains (for example, weight domain, attention score domain, and the like), the memory operation of each domain of the neural network model's parameters (for example, weights, input parameters, output parameters) can be easily processed.

The system on chip 1000 according to the fourth embodiment of the first example of the present disclosure provides a plurality of shared memories 400-1~400-N, and by executing an execution code set to preferentially store reusable parameters in the plurality of shared memories 400-1~400-N, the power consumption of the system on chip 1000 can be reduced. In addition, by providing a plurality of independent shared memories, the memory operation of each domain of the neural network model's parameters (for example, weights, input parameters, output parameters) can be easily processed.

Figure 11:
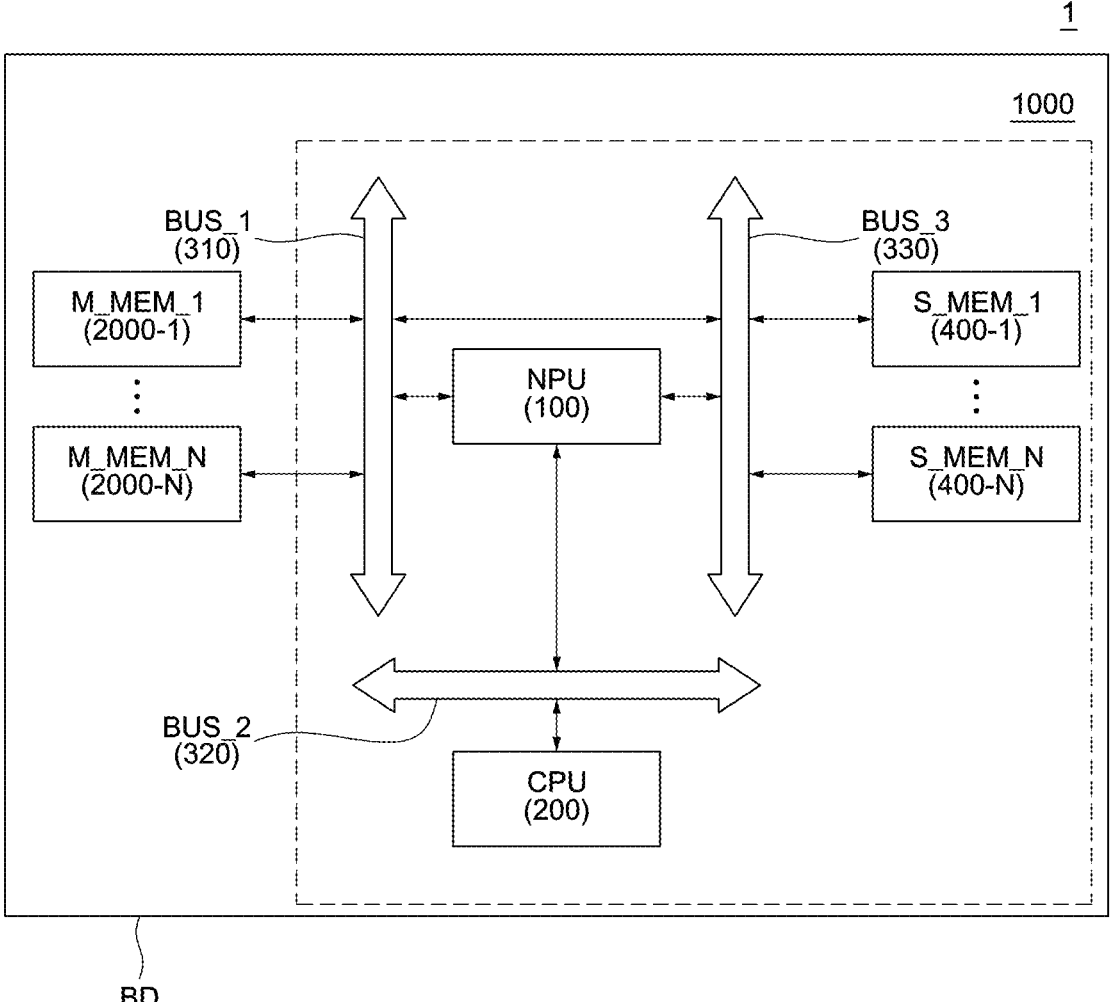
FIG. 11 is a block diagram illustrating a system on chip technology according to a fifth embodiment of the first example of the present disclosure.

FIG. 11 illustrates a system on chip technology according to a fifth embodiment of the first example of the present disclosure. A device 1 according to the fifth embodiment of the first example of the present disclosure will be described with reference to FIG. 11.

Referring FIG. 11, the device 1 includes a circuit board BD, a plurality of main memories 2000-1~2000-N, and a system on chip 1000. In describing the system on chip 1000 according to the fifth embodiment of the first example of the present disclosure, overlapping descriptions with those in FIG. 3 to FIG. 10 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the fifth embodiment of the first example of the present disclosure is configured to include a neural processing unit (NPU) 100, a central processing unit (CPU) 200, a first bus 310, a second bus 320, a third bus 330, and a plurality of shared memories 400-1~400-N. The plurality of shared memories 400-1~400-N are configured as on-chip memories of the system on chip 1000. The plurality of main memories 2000-1~2000-N are configured to be electrically connected to the first bus 310. The plurality of main memories 2000-1~2000-N are configured to include at least one semiconductor chip. The plurality of shared memories 400-1~400-N are configured to be electrically connected to the third bus 330.

The first bus 310 may be provided between the NPU 100 and the plurality of main memories 2000-1~2000-N. The second bus 320 may be provided between the NPU 100 and the CPU 200. The third bus 330 may be provided between the NPU 100 and the plurality of shared memories 400-1~400-N. Here, the first bus 310 and the third bus 330 are configured to be electrically connected.

The NPU 100 is described with reference to FIG. 3 to FIG. 6, and the CPU 200 is described with reference to FIG. 7, such that their redundant descriptions may be omitted. In addition, a duplicate description regarding the plurality of main memories 2000-1~2000-N refers to FIG. 8. A duplicate description regarding the plurality of shared memories 400-1~400-N refers to FIG. 10.

The plurality of main memories 2000-1~2000-N may be configured as a plurality of memories disposed outside the system on chip 1000. The total capacity of the plurality of main memories 2000-1~2000-N may be determined considering the parameter size of at least one neural network model to be driven in the system on chip 1000. Furthermore, the total capacity of the plurality of main memories 2000-1~2000-N may be configured to be larger than the total capacity of the plurality of shared memories 400-1~400-N. Therefore, by providing a plurality of main memories outside the system on chip 1000, the manufacturing cost of the system on chip 1000 can be reduced.

The plurality of shared memories 400-1~400-N may be configured as a plurality of memories disposed inside the system on chip 1000. The total capacity of the plurality of shared memories 400-1~400-N may be configured to be larger than the capacity of the internal memory 500 of the NPU 100. Therefore, by placing reusable parameters in the plurality of shared memories 400-1~400-N, the data read from or transmitted to the plurality of main memories 2000-1~2000-N can be reduced, thereby reducing the power consumption of the device 1.

A compiler (not shown) may, when generating the execution code of a neural network model to be processed by the system on chip 1000, set reusable input parameters, output parameters, and weight values to be preferentially stored in the plurality of shared memories 400-1~400-N rather than the plurality of main memories 2000-1~2000-N.

The device 1 according to the fifth embodiment of the first example of the present disclosure, by combining the features of the second embodiment and the fourth embodiment of the first example of the present disclosure, can support a generative neural network model with a large number of parameters and improve data reuse with an expandable main memory and an expandable shared memory.

Figure 12:
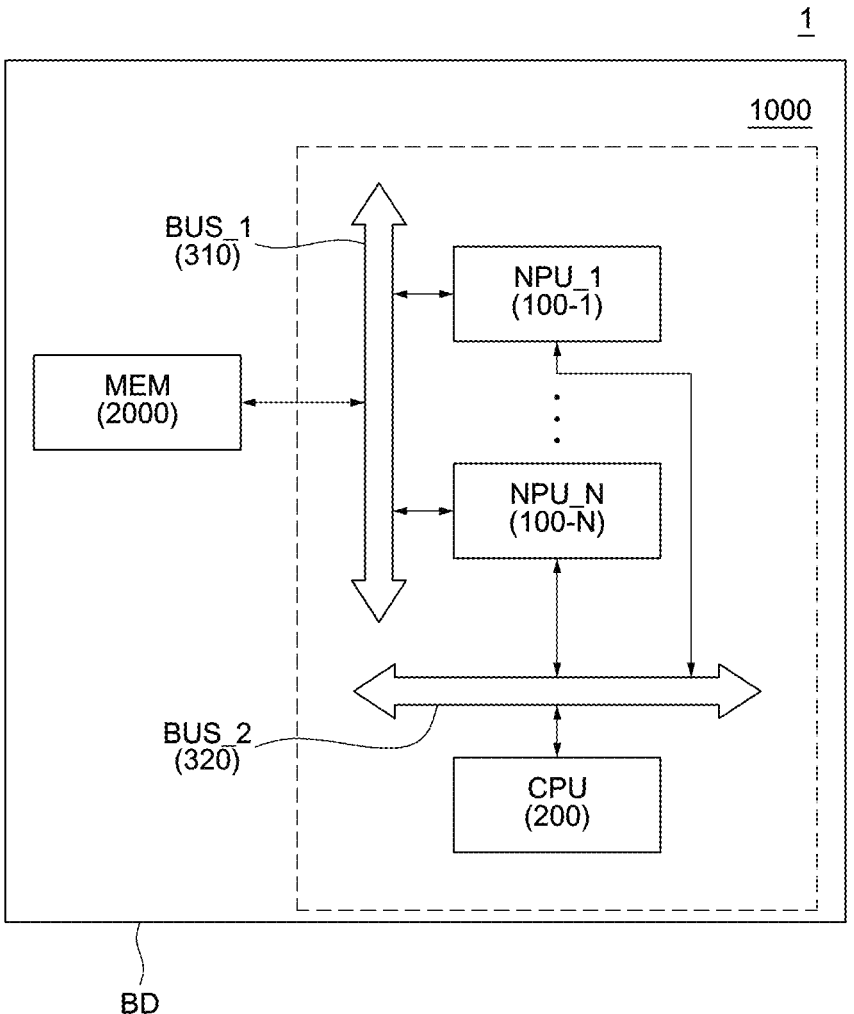
FIG. 12 is a block diagram illustrating a system on chip technology according to a sixth embodiment of the first example of the present disclosure.

FIG. 12 illustrates a system on chip technology according to a sixth embodiment of the first example of the present disclosure. A device 1 according to the sixth embodiment of the first example of the present disclosure will be described with reference to FIG. 12.

Referring to FIG. 12, the device 1 includes a circuit board BD, a memory 2000, and a system on chip 1000. In describing the system on chip 1000 according to the sixth embodiment of the first example of the present disclosure, overlapping descriptions with those in FIG. 3 to FIG. 11 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the sixth embodiment of the first example of the present disclosure is configured to include a plurality of neural processing units 100-1~100-N, a central processing unit (CPU) 200, a first bus 310, and a second bus 320. The memory 2000 is configured to be electrically connected to the first bus 310.

Each of the plurality of neural processing units 100-1~100-N may be configured to communicate with the memory 2000. The first bus 310 may be provided between the plurality of neural processing units 100-1~100-N and the memory 2000.

Each of the plurality of neural processing units 100-1~100-N may be configured to communicate with the CPU 200. The second bus 320 may be provided between the plurality of neural processing units 100-1~100-N and the CPU.

The plurality of neural processing units 100-1~100-N is described with reference to FIG. 3 to FIG. 6. Accordingly, their duplicate description may be omitted.

The processing performance (e.g., TOPS) of each of the plurality of neural processing units 100-1~100-N may be the same as or different from each other. Each of the plurality of neural processing units 100-1~100-N may be configured to operate independently. Each of the plurality of neural processing units 100-1~100-N may be configured to process the operations of a specific neural network model in parallel.

The CPU 200 is described with reference to FIG. 7. Accordingly, its duplicate description may be omitted.

The CPU 200 may be configured to control each of the plurality of neural processing units 100-1~100-N based on the execution code of a neural network model. Here, a compiler (not shown) may be configured to generate a respective execution code corresponding to each of the plurality of neural processing units 100-1~100-N. The CPU may be configured to control the plurality of neural processing units 100-1~100-N by directly setting the register values of the circuits of each of the plurality of neural processing units 100-1~100-N based on the respective execution code.

The memory 2000 may be configured as a main memory disposed outside the system on chip 1000. The memory 2000 may be configured as a single (homogeneous) memory or a heterogeneous memory. The capacity of the memory 2000 may be determined considering the parameter size of at least one neural network model to be driven in the system on chip 1000. The bandwidth of the first bus 310 may be determined according to the processing performance of the plurality of neural processing units 100-1~100-N.

The bandwidth of the first bus 310 may be determined according to the processing performance (e.g., TOPS) of the plurality of neural processing units 100-1~100-N. For example, a memory bandwidth of 2 GB/s to 4 GB/s per 1 TOPS may be required for the memory 2000. For example, if there are two 10 TOPS NPUs, the memory 2000 may be configured to provide a bus bandwidth of 40 GB/s to 80 GB/s. The bandwidth of the first bus 310 may be determined according to the operating frequency of the memory 2000 and the number of communication channels.

The system on chip 1000 according to the sixth embodiment of the first example of the present disclosure has the effect of being able to generate a response to an input query more quickly by improving the parallel processing performance of a neural network model by providing a plurality of neural processing units 100-1~100-N.

Figure 13:
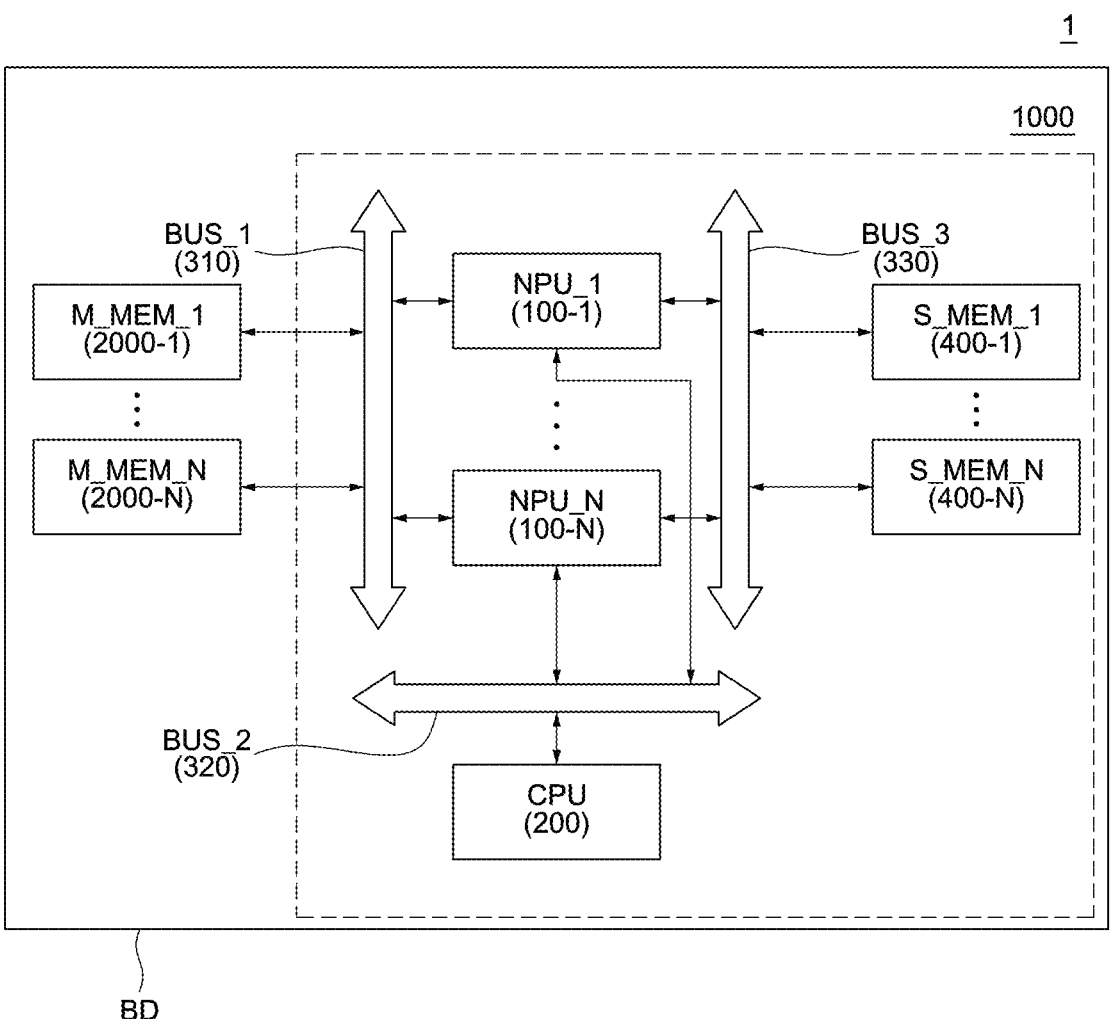
FIG. 13 is a block diagram illustrating a system on chip technology according to a seventh embodiment of the first example of the present disclosure.

FIG. 13 illustrates a system on chip according to a seventh embodiment of the first example of the present disclosure. A device 1 according to the seventh embodiment of the first example of the present disclosure will be described with reference to FIG. 13.

Referring to FIG. 13, the device 1 includes a circuit board BD, a plurality of main memories 2000-1~2000-N, and a system on chip 1000. In describing the system on chip 1000 according to the seventh embodiment of the first example of the present disclosure, overlapping descriptions with those in FIG. 3 to FIG. 12 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the seventh embodiment of the first example of the present disclosure is configured to include a plurality of neural processing units 100-1~100-N, a central processing unit (CPU) 200, a first bus 310, a second bus 320, a third bus 330, and a plurality of shared memories 400-1~400-N. The plurality of shared memories 400-1~400-N are configured as on-chip memories of the system on chip 1000. The plurality of main memories 2000-1~2000-N are configured to be electrically connected to the first bus 310. The plurality of main memories 2000-1~2000-N are configured to include at least one semiconductor chip. The plurality of shared memories 400-1~400-N are configured to be electrically connected to the third bus 330.

The first bus 310 may be provided between the plurality of neural processing units 100-1~100-N and the plurality of main memories 2000-1~2000-N. The second bus 320 may be provided between the plurality of neural processing units 100-1~100-N and the CPU 200. The third bus 330 may be provided between the plurality of neural processing units 100-1~100-N and the plurality of shared memories 400-1~400-N. Here, the first bus 310 and the third bus 330 are configured to be electrically connected.

The NPU 100 is described in reference to FIG. 3 to FIG. 6, such that redundant description of NPU operation may be omitted. The CPU 200 is described with reference to FIG. 7, such that its duplicate description may be omitted. The plurality of main memories 2000-1~2000-N are described in reference to FIG. 8, such that their duplicate description may be omitted. The plurality of shared memories 400-1~400-N are described in reference to FIG. 10, such that their redundant description may be omitted. The plurality of neural processing units 100-1~100-N are described in reference to FIG. 12, such that their redundant description may be omitted.

The plurality of main memories 2000-1~2000-N may be configured as a plurality of memories disposed outside the system on chip 1000. The total capacity of the plurality of main memories 2000-1~2000-N may be determined considering the parameter size of at least one neural network model to be driven in the system on chip 1000. The total capacity of the plurality of main memories 2000-1~2000-N may be configured to be larger than the total capacity of the plurality of shared memories 400-1~400-N. Therefore, by providing a plurality of main memories outside the system on chip 1000, the manufacturing cost of the system on chip 1000 can be reduced.

The plurality of shared memories 400-1~400-N may be configured as a plurality of memories disposed inside the system on chip 1000. The total capacity of the plurality of shared memories 400-1~400-N may be configured to be larger than the capacity of the internal memory 500 of the NPU 100. Therefore, by placing reusable parameters in the plurality of shared memories 400-1~400-N, the data read from or transmitted to the plurality of main memories 2000-1~2000-N can be reduced, thereby reducing the power consumption of the device 1.

A compiler (not shown) may, when generating the execution code of a neural network model to be processed by the system on chip 1000, set reusable input parameters, output parameters, and weight values to be preferentially stored in the plurality of shared memories 400-1~400-N rather than the plurality of main memories 2000-1~2000-N.

The device 1 according to the seventh embodiment of the first example of the present disclosure, by combining the features of the fifth embodiment and the sixth embodiment of the first example of the present disclosure, provides a plurality of neural processing units, an expandable main memory, and an expandable shared memory. Accordingly, a generative neural network model with a large number of parameters can be supported by parallel processing by a plurality of neural processing units while improving data reuse.

Figure 14:
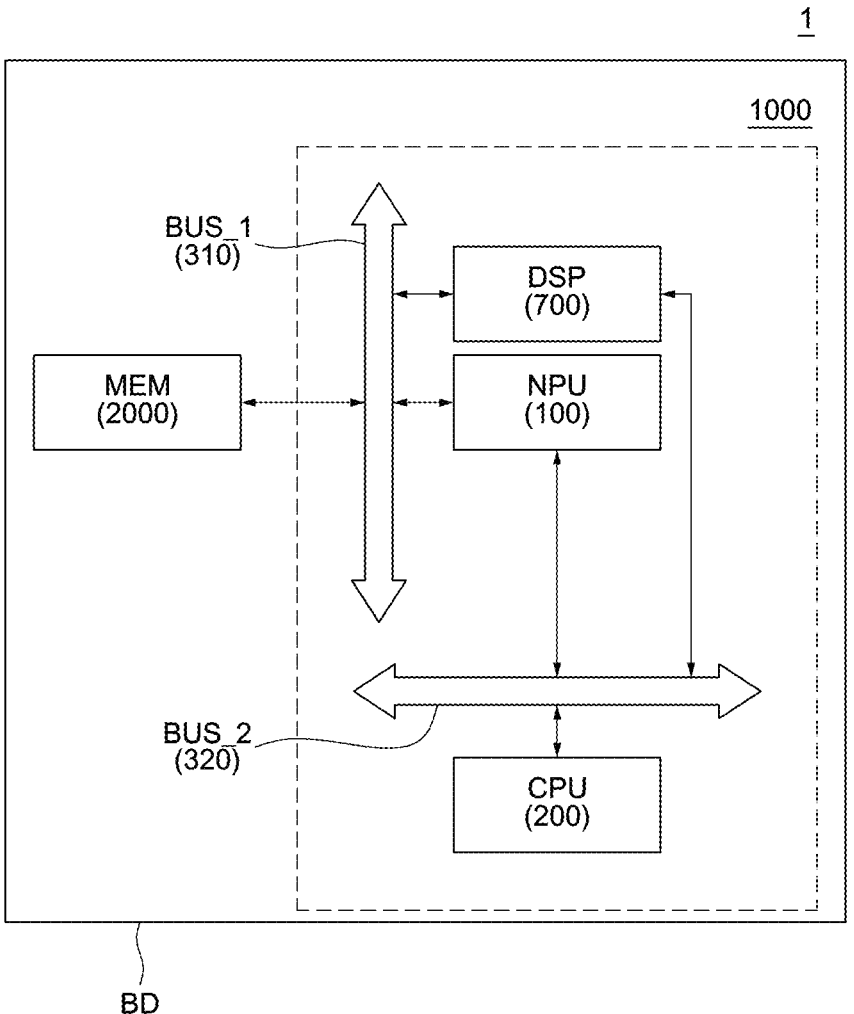
FIG. 14 is a block diagram illustrating a system on chip technology according to an eighth embodiment of the first example of the present disclosure.

FIG. 14 illustrates a system on chip technology according to an eighth embodiment of the first example of the present disclosure. A system on chip 1000 according to the eighth embodiment of the first example of the present disclosure will be described with reference to FIG. 14.

Referring to FIG. 14, the device 1 includes a circuit board BD, a memory 2000, and a system on chip 1000. In describing the system on chip 1000 according to the eighth embodiment of the first example of the present disclosure, overlapping descriptions with those in FIG. 3 to FIG. 13 may be omitted for convenience of explanation. Each example and each embodiment of the present disclosure may be modified and implemented in combination with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the eighth embodiment of the first example of the present disclosure is configured to include a neural processing unit (NPU) 100, a central processing unit (CPU) 200, a first bus 310, and a second bus 320. Here, the system on chip 1000 according to the eighth embodiment of the first example of the present disclosure is further configured to include a digital signal processing unit (DSP) 700. A memory 2000 is configured to be electrically connected to the first bus 310. The memory 2000 is configured to include at least one semiconductor chip.

The first bus 310 may be provided between the NPU 100 and the memory 2000. The first bus 310 may be provided between the DSP 700 and the memory 2000. The second bus 320 may be provided between the NPU 100 and the CPU 200. The second bus 320 may be provided between the DSP 700 and the CPU 200.

The NPU 100 is described in reference to FIG. 3 to FIG. 6, and the CPU 200 is described in reference to FIG. 7, such that their redundant description may be omitted. The memory 200 is described in reference to FIG. 7 to FIG. 11, such that its redundant description may be omitted.

The DSP 700 may be configured to process at least a part of the operations of a neural network model that are inefficient to process in the NPU 100. The DSP 700 includes at least one vector processor (not shown) and at least one scalar processor (not shown).

The system on chip 1000 according to the eighth embodiment of the first example of the present disclosure, which further provides a digital signal processing unit, can offload specific operations of a neural network model that are inefficient to process in the NPU 100. Therefore, the system on chip 1000 can process the neural network model quickly in real time.

Figure 15:
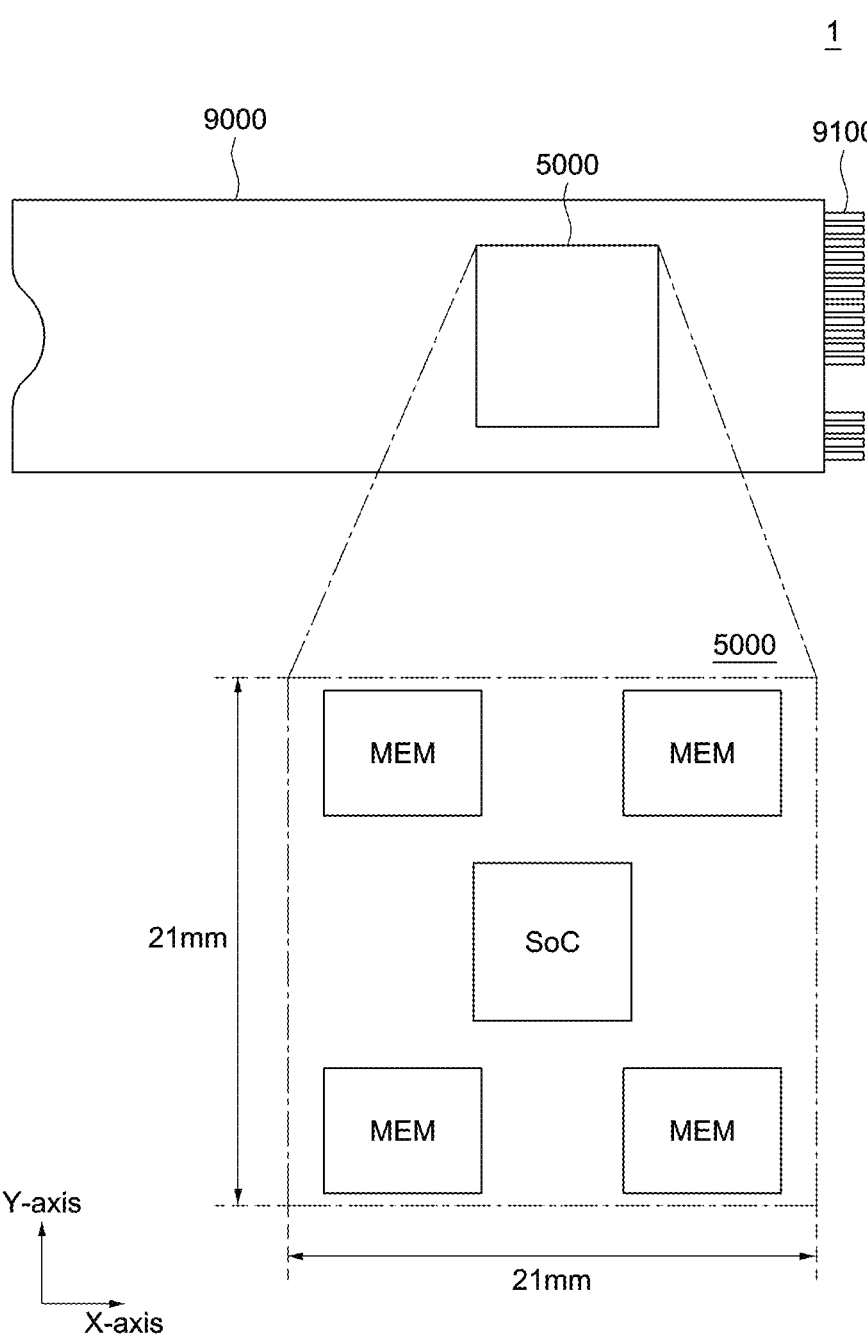
FIG. 15 is a conceptual diagram illustrating a device according to a first embodiment of a second example of the present disclosure.

FIG. 15 illustrates a device 1 according to a first embodiment of a second example of the present disclosure. FIG. 15 may be a plan view of the device 1. The size of each of the hardware components described with reference to FIG. 15 may mean width (X-axis length) and depth (Y-axis length), but is not limited thereto.

Referring to FIG. 15, the device 1 according to the first embodiment of the second example of the present disclosure includes a circuit board 9000 and a package 5000. The circuit board 9000 may further include a plurality of contacts 9100 configured to engage with, for example, an M.2 slot. The device 1 according to the first embodiment of the second example of the present disclosure may correspond to the device 1 according to the embodiments of the first example of the present disclosure. The circuit board 9000 according to the first embodiment of the second example of the present disclosure may correspond to the circuit board BD according to the embodiments of the first example of the present disclosure. The package 5000 according to the first embodiment of the second example of the present disclosure may correspond to the package (not shown) in the embodiments of the first example of the present disclosure. Duplicate descriptions explained with reference to FIG. 3 to FIG. 14 may be omitted.

The device 1 according to the first embodiment of the second example of the present disclosure may be configured as a system on chip SoC. A system on chip SoC may mean a semiconductor package that integrates at least one neural processing unit and components of various electronic systems. A system on chip SoC can integrate digital circuits, analog circuits, mixed-signal, and radio frequency processing circuits in a single package. For example, a system on chip SoC may further include at least one of a central processing unit, a digital signal processor, an image signal processor, and a graphics processing unit in addition to a neural processing unit. A system on chip SoC may include at least one memory MEM. A system on chip SoC may include a high-speed data bus for efficient communication between various circuits included in the system on chip SoC. A system on chip SoC may include at least one interface such as PCIe, USB, I2C, SPI, UART, GPIO for connection with external devices and sensors. A system on chip SoC may include an on-chip power management unit that regulates the voltage and power distribution of the semiconductor package. A system on chip SoC may include a communication interface that integrates wired or wireless communication protocols such as Ethernet, Wi-Fi, Bluetooth, cellular connection for data transmission.

Meanwhile, the device 1 illustrated in FIG. 15 is an example implemented in an M.2 form factor. In the first embodiment of the second example of the present disclosure, the width of the circuit board 9000 is 22 mm and the depth may be 42 mm, 60 mm, 80 mm, or 110 mm, but is not limited thereto.

The M.2 board is a next-generation interface standard for high-speed data transmission, providing high speed and high efficiency, and is designed in a compact size, being adopted in various devices such as laptops, desktops, and mini-PCs. In particular, a small form factor such as M.2 is easy to apply on-device.

The package 5000 mounted on the device 1 may include a system on chip SoC and at least one memory MEM. The system on chip SoC according to the first embodiment of the second example of the present disclosure may correspond to the system on chip 1000 according to the embodiments of the first example of the present disclosure. The memory MEM of FIG. 15 may correspond to the main memory 2000 described above with reference to FIG. 7 to 14.

The physical size of the system on chip SoC may be, for example, 4.50 mm×4.85 mm. However, the present disclosure is not limited thereto. Considering the minimum separation distance required between the system on chip SoC and the memories MEM, the physical size of each memory MEM may be limited to 6.43 mm×5.30 mm. However, the present disclosure is not limited to the size or dimensions of each component.

Meanwhile, the maximum number of memories MEM in the package 5000 may be determined considering the processing capability (e.g., TOPS) of the system on chip SoC, or a package size that is smaller than a specific size that satisfies the size of a specific form factor applied to the system on chip SoC.

According to an embodiment of the present disclosure, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above configuration, the size of the system on chip SoC can be reduced to be suitable for the standard of a specific form factor (e.g., M.2). In particular, in the case of on-device, if the size of the system on chip SoC is large, it can be an obstacle to commercialization.

Meanwhile, the package 5000 may include up to four memories MEM. Each memory MEM may be a low-power double data rate 5 (LPDDR5) device. If the number of bus channels between the system on chip SoC and the memories MEM is increased to correspond to the number of memories MEM, the memory bandwidth of the first bus 310 of the embodiments of the first example of the present disclosure can be increased. For example, if the system on chip SoC and the four memories MEM of the package 5000 are placed closest to each other, the size of the package 5000 can be 21 mm×31 mm. In this embodiment, the package 5000 can be mounted on a device 1 having a width of 22 mm and a depth of 42 mm.

However, the package 5000 of FIG. 15 cannot be mounted on a circuit board 9000 having a depth of 30 mm. Therefore, FIG. 16 describes an embodiment that a package 5000 including a system on chip SoC and four memories MEM can be mounted on a circuit board 9000 having a depth of 30 mm.

The package 5000 may include at least one semiconductor chip to which a fan-in semiconductor package, a fan-out semiconductor package, a package on package (PoP), and/or a 2.5D package method is applied. In addition, the technical features of different examples of the present disclosure may be combined and modified.

Figure 16:
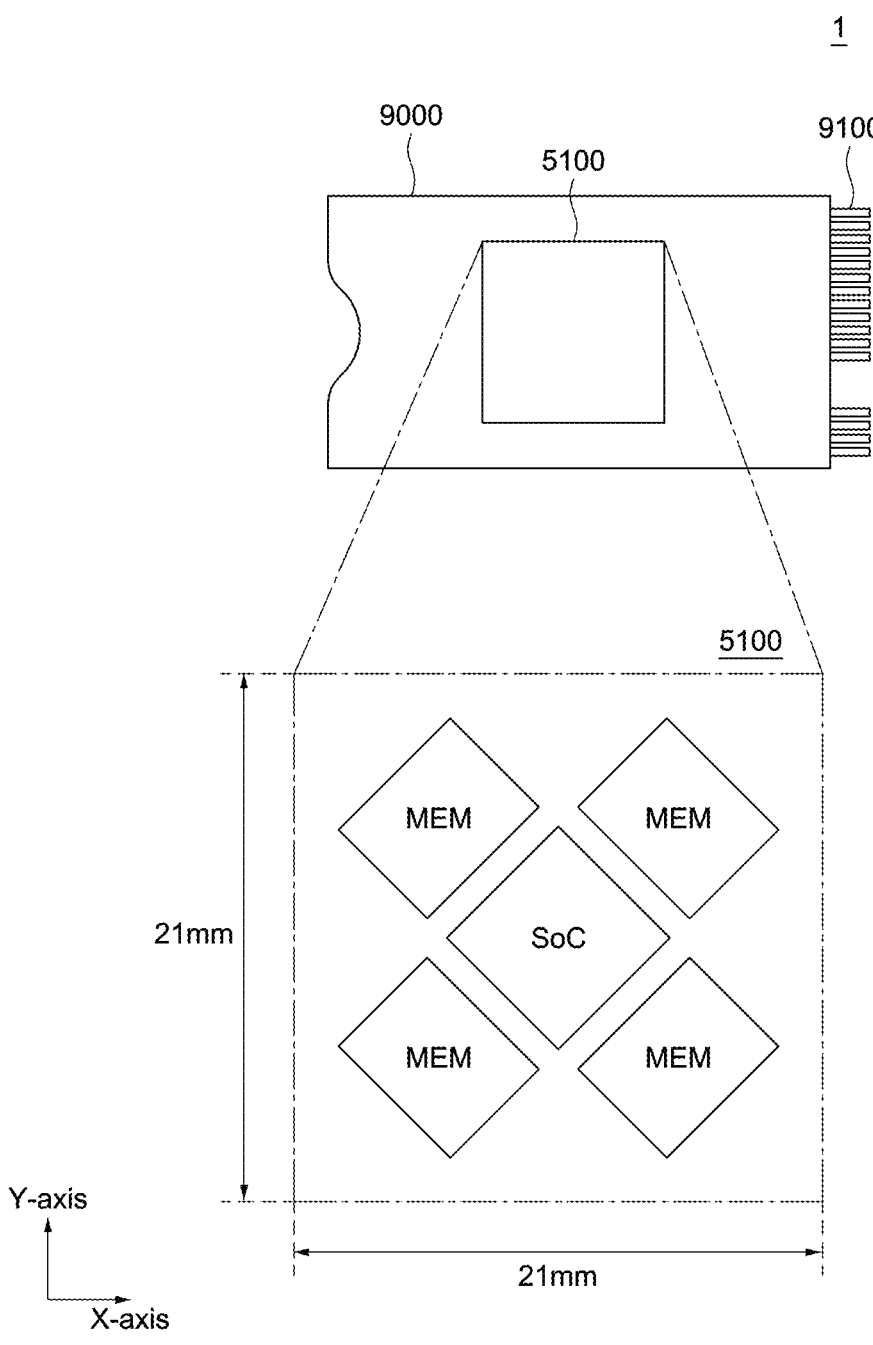
FIG. 16 is a conceptual diagram illustrating a device according to a second embodiment of the second example of the present disclosure.

FIG. 16 illustrates a device 1 according to a second embodiment of the second example of the present disclosure. FIG. 16 may be a plan view of the device 1. The size of each of the hardware components described with reference to FIG. 16 may mean width (X-axis length) and depth (Y-axis length), but is not limited thereto.

Referring to FIG. 16, the device 1 according to the second embodiment of the second example of the present disclosure includes a circuit board 9000 and a package 5100. The circuit board 9000 may further include a plurality of contacts 9100 configured to engage with, for example, an M.2 slot. The device 1 according to the second embodiment of the second example of the present disclosure may correspond to the device 1 according to the embodiments of the first example of the present disclosure. The circuit board 9000 according to the second embodiment of the second example of the present disclosure may correspond to the circuit board BD according to the embodiments of the first example of the present disclosure. The package 5100 according to the second embodiment of the second example of the present disclosure may correspond to the package (not shown) in the embodiments of the first example of the present disclosure. Duplicate descriptions among the contents described above with reference to FIG. 3 to FIG. 15 may be omitted. In addition, in describing the second embodiment of the second example of the present disclosure, duplicate descriptions with the first embodiment of the second example may be omitted for convenience of explanation.

Meanwhile, the device 1 illustrated in FIG. 16 is an example implemented in an M.2 form factor. In the second embodiment of the second example of the present disclosure, the width of the circuit board 9000 may be 22 mm and the depth may be 30 mm, but is not limited thereto.

The package 5100 mounted on the device 1 may include a system on chip SoC and at least one memory MEM. The system on chip SoC according to the second embodiment of the second example of the present disclosure may correspond to the system on chip 1000 according to the embodiments of the first example of the present disclosure. The memory MEM of FIG. 16 may correspond to the main memory 2000 described above with reference to FIG. 7 to 13.

The width of the circuit board 9000 illustrated in FIG. 16 may be 22 mm, and the depth may be 30 mm. In order to mount the package 5100 within such a restrictive size, the arrangement of the system on chip SoC and the plurality of memories MEM within the package 5100 must be improved.

The physical size of the system on chip SoC may be 4.50 mm×4.85 mm, and the physical size of each memory MEM may be 6.43 mm×5.30 mm.

According to an embodiment of the present disclosure, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above configuration, the size of the system on chip SoC can be reduced to be suitable for the standard of a specific form factor (e.g., M.2).

The system on chip SoC and the plurality of memories MEM may be arranged in a diagonal direction of the package 5100. In this case, the size of the package 5100 can be reduced to 21 mm×21 mm. To elaborate, the configuration of the plurality of semiconductor chips arranged inside the package 5100 may be referred to as a "rotated multi-chip substrate layout." The package 5100 of the rotated multi-chip substrate layout has the effect of being able to reduce the size of the package 5100 due to the arrangement of each semiconductor chip rotated at a specific angle. That is, the X-axis of the system on chip SoC and the X-axis of the substrate 5100 may not be parallel. The Y-axis of the system on chip SoC and the Y-axis of the substrate 5100 may not be parallel. The X-axis of the memory MEM and the X-axis of the substrate 5100 may not be parallel. The Y-axis of the memory MEM and the Y-axis of the substrate 5100 may not be parallel.

Meanwhile, the number of memories MEM in the package 5100 may be changed considering the processing capability (e.g., TOPS) of the system on chip SoC, the size of a specific form factor, and a size that can be placed within a package smaller than the specific form factor.

The package 5100 may be configured to include at least one semiconductor chip to which a fan-in semiconductor package, a fan-out semiconductor package, a package on package (PoP), and/or a 2.5D package method is applied. In addition, the technical features of different examples of the present disclosure may be combined and modified.

That is, the package 5100 may include a semiconductor package substrate, a system on chip SoC rotated at a first angle with respect to one side of the semiconductor package substrate on a planar basis and disposed on the semiconductor package substrate, and one or a plurality of memories MEM rotated at a second angle with respect to one side of the semiconductor package substrate on a planar basis and disposed on the semiconductor package substrate adjacent to the system on chip SoC. Here, the first angle and the second angle may be determined so that the size of the package 5100 is smaller than the size of a specific form factor.

Figure 17:
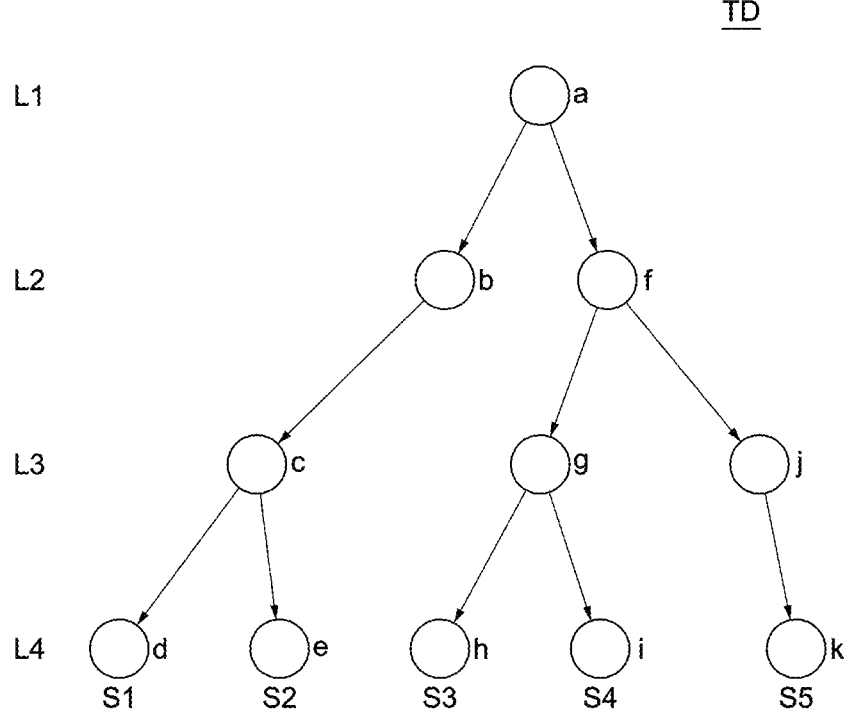
FIG. 17 is a conceptual diagram illustrating a tree for explaining speculative decoding according to a third example of the present disclosure.

FIG. 17 illustrates a tree for explaining speculative decoding according to a third example of the present disclosure.

Hereinafter, the speculative decoding method according to the third example of the present disclosure may be performed in the device 1 described with reference to FIG. 3 to 16. Accordingly, in describing the third example of the present disclosure, duplicate descriptions with the first example and the second example may be omitted for convenience of explanation.

A transformer-based generative artificial intelligence (AI) model can receive a query and generate a response through an iterative token prediction process. For example, a language model can receive a query in text form, convert the query into an input token or a sequence of input tokens through tokenization, and generate an output token from the input token using its trained parameters. The generation process typically involves passing the token sequence through multiple transformer layers, where each layer applies attention mechanisms and feed-forward computations to refine contextual embeddings. Subsequently, the query and the generated output token are input back into the language model to generate the next output token. This token generation operation can be repeated until the response is complete according to a stopping criterion such as an end-of-sequence token or a length limit. A token may correspond to a complete word, a subword, or even a single character depending on the tokenizer design. A complete (final) response may thus include a sequence of output tokens generated through repeated autoregressive inference.

The larger the number of parameters of a language model, the higher the computational cost for generating a response. This cost arises from the increased number of matrix multiplications and attention operations required in each forward pass. Therefore, using a language model with billions of parameters results in significant demand on memory bandwidth, floating-point compute units, and power consumption. Reducing the number of parameters can lower computational cost and improve response latency, enabling faster output generation, but may degrade the quality or accuracy of responses due to reduced representational capacity and context handling. The number of parameters, accuracy, and execution time have a trade-off relationship that system designers must balance. In many applications, to achieve human-like fluency and reasoning, the parameter count must remain high enough to capture long-range dependencies and nuanced semantics in natural language. In particular, to generate a response of at least a predetermined level of quality, the number of parameters of the language model will be quite large.

For commercial services intended to run the language model directly on a client device, additional constraints emerge due to hardware limitations. Devices such as smartphones, embedded AI modules, or IoT systems are limited in energy consumption, battery life, DRAM capacity, and AI accelerator throughput. Thermal management may also limit sustained high-load operation. Large language models can easily exceed on-device memory budgets, requiring techniques to reduce model size, quantize weights, or offload parts of the computation to external resources. Without optimization, such constraints can cause response delays, battery drain, or even prevent execution entirely.

Accordingly, the third example of the present disclosure introduces a speculative decoding method for driving heterogeneous language models under limited hardware resources in device 1. Speculative decoding is designed to reduce the number of high-cost invocations of a large model by pairing it with a smaller, faster model that can make preliminary predictions.

Speculative decoding is a cooperative inference technique where multiple language models each perform predictions, and the results are combined to produce a reliable final answer. For example, a first language model (lower model or LM) may propose multiple candidate tokens for the next position in the sequence, each with an associated probability score. These candidate tokens are then verified by a second language model (upper model or UM), which considers a broader context and selects the token that best fits the query and preceding output tokens. The second model generally has a larger number of parameters and higher representational power, enabling it to detect errors or weak predictions made by the first model. This two-stage approach allows many token predictions to bypass the slower model while still benefiting from its accuracy when needed.

The device 1 according to the examples of the present disclosure can operate heterogeneous language models on at least one system on chip (SoC) 1000, where each SoC may include dedicated AI accelerators, general-purpose CPUs, GPUs, and memory subsystems. In an on-device method, speculative decoding utilizes the heterogeneous models to accelerate token generation while maintaining accuracy. A task scheduler within the device can manage how queries and candidate token sets are distributed between the lower and upper models, ensuring that the faster model handles the bulk of the predictions and the slower model only validates or corrects them when necessary.

The heterogeneous language model system may include a lower model with fewer parameters and an upper model with more parameters. The parameter disparity allows the lower model to process candidate tokens with low latency, while the upper model provides higher-quality verification. For example, the upper model may have seven billion parameters while the lower model has one billion. In practice, the parameter count and architecture of each model can be tuned for a specific application or hardware configuration. Quantization and pruning can further reduce the memory footprint of the lower model, allowing it to run entirely on-chip without DRAM access, while the upper model may use external memory to store its larger weight matrices.

In speculative decoding, the lower model generates probabilities for candidate tokens based on its current internal state and the accepted token history. These candidate tokens are forwarded to the upper model, which recalculates probabilities using its own attention and feed-forward layers. The upper model may accept or reject each candidate token by comparing probability ratios or likelihood thresholds between the two models. Accepted tokens are appended to the output sequence without further processing, while rejected tokens trigger additional computation by the upper model to generate a new prediction. This acceptance-rejection mechanism minimizes the number of expensive upper model calls.

According to the speculative decoding of the third example of the present disclosure, the lower model can generate one or more candidate token sets for each decoding step. Each set includes one or more candidate tokens, and the size of the set can be adaptively chosen based on model confidence, measured for example via entropy of the probability distribution. Larger candidate sets increase the chance of including the correct token but require more verification work by the upper model. Balancing candidate set size with hardware constraints and target response latency is a key aspect of optimizing speculative decoding for heterogeneous on-device language model execution.

As indicated in Table 1 below, a candidate token set (i.e., Set 1, Set 2, or Set 3) is a set including one or more candidate tokens (e.g., apple, is, red, banana, yellow, car, fast).

TABLE 1

| Candidate Tokens | Candidate Token Set |
|---|---|
| apple, is, red, banana, yellow, car, fast | Set 1: [apple, is, red] |
| | Set 2: [banana, is, yellow] |
| | Set 3: [car, is, fast] |

The upper model can accept or reject the corresponding candidate token set by sampling for each of one or more candidate token sets. In this approach, the sampling operation may be performed in parallel across candidate sets, which reduces the number of sampling iterations required compared to sampling for each token individually. Here, when the device 1 samples for each candidate token set, the device 1 can generate more tokens faster than when sampling for each token because the computational overhead of repeated model invocations is reduced. In addition, the probability distributions of the lower model and the upper model can also be maintained similarly, which helps to ensure consistent statistical behavior across the pipeline. The token generation speed may be referred to as TPS (tokens per second), and in certain implementations, batching candidate sets during acceptance/rejection can significantly increase TPS without proportionally increasing memory usage or latency.

The speculative decoding according to the third example of the present disclosure may operate in an auto-regressive token generation method. In such a method, the generation of each token is conditioned on all previously generated tokens, and the model state is updated iteratively. The auto-regressive token generation method generates a token by re-inputting a series of tokens generated in the lower model back into the lower model, thereby maintaining continuity in the context. The lower model generates one token for each auto-regression cycle, and the inference results from multiple cycles can be aggregated. Therefore, if the lower model performs N inferences, N series of tokens are generated, each representing a distinct possible continuation path. The lower model generates a conditional probability distribution related to the N series of tokens, which quantifies the likelihood of each sequence given the current context. Subsequently, the upper model processes the N series of tokens generated by the lower model and the associated conditional probability distributions to generate its own refined probability distribution. Therefore, the upper model can accept or reject the token generated by the lower model by comparing the probability distribution generated by the upper model and the conditional probability distribution generated by the lower model. When the similarity is greater than or equal to a threshold value, the corresponding token is accepted, and when the similarity is less than the threshold value, the corresponding token may be rejected, prompting regeneration.

The upper model can accept or reject a series of tokens generated by the lower model based on a threshold value. This evaluation can occur on a per-token basis or on the basis of aggregated statistics for an entire set. If a specific token among the series of tokens is rejected, the tokens up to the previous token of the rejected token become the final output tokens, ensuring the partial results remain valid. For example, the lower model of speculative decoding can generate tokens in set units, which can represent multiple steps of decoding in advance. In this case, the upper model can accept or reject each of a plurality of token sets generated by the lower model, and the decision logic can incorporate confidence scores or acceptance ratios. If the lower model generates candidate tokens in set units, the acceptance or rejection judgment in the upper model can also be performed in set units, which can improve the token generation speed of the speculative decoding of the device 1 by minimizing backtracking. As the number of token sets generated by the lower model increases, the probability that the upper model will accept a token set may increase.

The lower model generates one or more candidate token sets in response to an input query. Each candidate token set includes a series of tokens, and the lower model can select a series of tokens with high probability in the probability distribution as a candidate token set. The probability threshold for inclusion can be configured dynamically based on the system's performance constraints or application-specific quality targets. Each candidate token set can be selected in various ways, including greedy decoding, beam search, or nucleus sampling, to generate sequences that balance diversity and likelihood. For example, each candidate token set can be generated by selecting the tokens with the highest probability within the probability distribution, but the present disclosure is not limited thereto. In order for the upper model to accept one candidate token set, the probabilities of the tokens included in each candidate token set can be summed or averaged to produce a set-level confidence measure. Therefore, the upper model can accept or reject the entire candidate token set based on the summed probability of the candidate token set, not the probability of each token. To elaborate, when using the probability of each token individually, it may be difficult to match the per-token probabilities between the lower and upper models, leading to frequent mismatches and increased rejection rates. When using the summed probability of a token set, the aggregated probability distributions between the lower and upper models are more closely aligned, which increases the acceptance probability of the upper model.

The lower model can generate one or more candidate token sets in response to an input query, and the token set generation process can be implemented in either a static or dynamic manner. In a static approach, the sequence length of each candidate token set can be preset to a fixed value, allowing predictable resource allocation. In a dynamic approach, the length of each candidate token set can be determined based on ongoing evaluations of acceptance likelihood or the complexity of the input prompt. The lower model can generate one or more candidate token sets and generate tree data by combining each candidate token set, effectively representing possible continuations as branching paths. Tree data (TD) includes a node at each branch point, where each node corresponds to a token position and contains the probability distribution for the next token.

Referring to FIG. 17, tree data TD includes one or more token sets generated by a lower model, according to an embodiment of the present disclosure. A first token set (S1), a second token set (S2), a third token set (S3), a fourth token set (S4), and a fifth token set (S5) are displayed below the leaf nodes of the tree.

The first candidate token set S1 may include four tokens (a, b, c, d). The second candidate token set S2 may include four tokens (a, b, c, e). The third candidate token set S3 may include four tokens (a, f, g, h). The fourth candidate token set S4 may include four tokens (a, f, g, i). The fifth candidate token set S5 may include four tokens (a, f, j, k). Each of the candidate token sets may be selected or rejected by the upper model.

The token length of each candidate token set may be set. For example, the sentence length of each token set may be set to four. However, the present disclosure is not limited thereto, and the length of the token set may be dynamically changed.

Each token may have an order level. The order level may correspond to the sentence length. Specifically, the first order level L1 corresponds to the token (a). The second order level L2 corresponds to the tokens (b, f). The third order level L3 corresponds to the tokens (c, g, j). The fourth order level L4 corresponds to the tokens (d, e, h, i, k). In the example where the sentence length is set to four, the maximum order level is set to four. The order of the tokens in each token set may be arranged according to the corresponding order level. Specifically, the first token (a) among the tokens (a, b, c, d) of the first token set S1 corresponds to the first order level L1. The second token (b) among the tokens (a, b, c, d) of the first token set S1 corresponds to the second order level L2. The third token (c) among the tokens (a, b, c, d) of the first token set S1 corresponds to the third order level L3. The fourth token (d) among the tokens (a, b, c, d) of the first token set S1 corresponds to the fourth order level L4.

Each token is defined as a node of the tree data TD. For example, the token (g) can be a branch node of the third token set S3 and the fourth token set S4 at the third order level L3. Each node includes branch information.

That is, the tree data TD generated by the lower model may include all or at least a part of one or more token sets S1 to S5, order levels L1 to L4, node information of each token (a, b, c, d, e, f, g, h, i, j, k), and the selection probability of each candidate token set (for example, the summed probability of the token set). The upper model can accept or reject at least one token of the tree data TD.

Speculative decoding may also be implemented as hybrid speculative decoding. Hybrid speculative decoding may set a threshold value a that determines whether a token is approved or rejected by comparing the probability distributions of the lower model and the upper model, after the previously speculatively generated token is verified by the upper model.

Speculative decoding may also be implemented as group speculative decoding. Group speculative decoding is configured to generate several tokens in group units in the lower model and have them verified by the upper model, and can provide a high level of efficiency.

Figure 18:
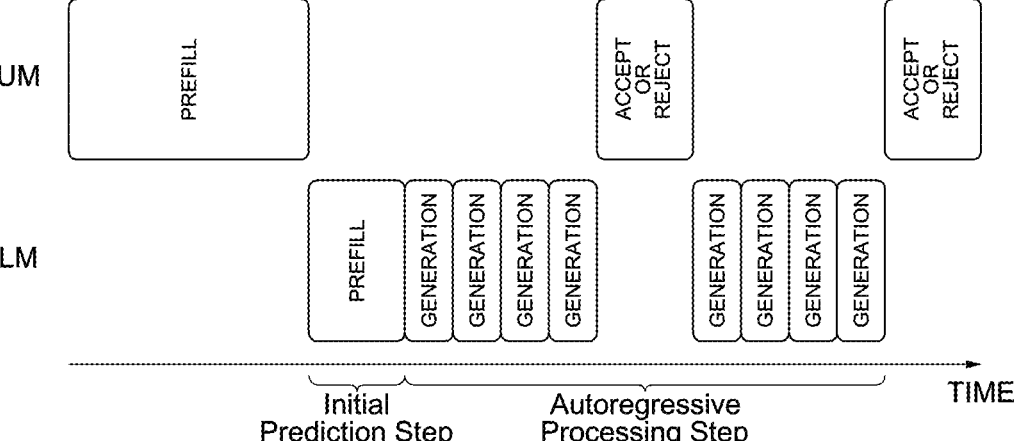
FIG. 18 is a conceptual diagram for explaining a speculative decoding operation according to a third example of the present disclosure.

FIG. 18 is for explaining a speculative decoding operation according to a third example of the present disclosure.

Referring to FIG. 18, a lower model (LM) and an upper model (UM) are illustrated. The device 1 according to the third example of the present disclosure may be configured to sequentially process the lower model and the upper model for speculative decoding. In one implementation, the LM may produce candidate tokens at high speed, while the UM validates them for final output, allowing both components to operate in a partially overlapping pipeline.

A transformer-based artificial intelligence model may perform predetermined operation steps (for example, a prefill step and a generation step) to generate a response to an input query. A transformer is an artificial intelligence model based on an attention mechanism and may include layers such as multi-head attention and feed-forward processing. A transformer utilizes a large number of matrix multiplication operations. It can obtain an attention score (Q, K, V), which is an output value, using an input value and parameters such as a query Q, a key K, and a value V. These attention scores are used to produce context-aware token representations. A transformer can process various inference operations based on the output value (i.e., attention (Q, K, V)) and is widely applied in generative language models, including those that implement speculative decoding for efficiency.

A tensor refers to a multi-dimensional matrix parameter processed in an artificial intelligence model (for example, an artificial neural network). A tensor may refer to various neural network model parameters such as weights, input parameters, output parameters, and attention parameters. In transformer models, tensors can be reshaped or transposed to match computation requirements at each stage of inference.

The prefill step is an initial step of processing and interpreting an input (for example, a prompt input by a user). The prefill step may include a tokenization step, a context embedding step, a processing step through layers, and a preparation step for decoding. The prefill step may be processed by one or more neural processing units. In the tokenization step, the input text is converted into tokens (sub-words, words, or characters), which are numerical representations used in the artificial intelligence model. In the context embedding step, the tokens are mapped to embedding vectors that encode semantic and syntactic features. In the prefill step, the embeddings are processed through layers of the model (for example, transformer blocks) to generate a contextual representation of the input tokens. In the preparation step for decoding, the model calculates the probability distribution of possible next tokens but does not yet commit to generating one, instead preparing the context for the generation step.

In the generation step, one or more neural processing units can sequentially generate one or more output tokens based on the context provided by the artificial intelligence model in the prefill step and the previously generated tokens. The generation step includes an initial prediction step, an autoregressive processing step, and a stopping condition. In the initial prediction step, the first token is generated by sampling from the probability distribution calculated earlier. In the autoregressive processing step, each new token is generated using both the prior tokens and the model's internal context. The generation process continues until a stopping condition is met, such as reaching a token limit or detecting an end-of-sequence token. The tokens generated in the generation step may correspond to the tree data TD of FIG. 17, which can include at least one token set for validation by the UM.

Referring again to FIG. 18, a third example illustrating the steps of speculative decoding according to the flow of time is shown. The speculative decoding according to examples of the present disclosure may be processed sequentially or in parallel by one or more neural processing units. In speculative decoding, an upper model (UM) and a lower model (LM) cooperate with each other to generate a response to an input query. The longer the horizontal length of the block representing each step, the more processing time is required.

Specifically, in speculative decoding, the UM first performs a prefill operation. Subsequently, the LM performs a prefill operation. Subsequently, the LM continuously performs a generation step, and in each generation step, each token is generated. Next, the UM accepts or rejects the tokens generated by the LM. The UM can accept or reject some or all of the tokens generated by the LM. The LM re-inputs the accepted tokens as an input query, and the LM continuously performs generation steps to generate each token corresponding to each generation step. Next, the UM accepts or rejects the tokens generated by the LM. The above steps are repeated until a stopping condition is met.

The number of parameters of the UM is larger than the number of parameters of the LM, so the processing time is longer. Therefore, the processing time of the prefill step of the UM is longer than the processing time of the prefill step of the LM. The processing time of the acceptance or rejection step of the UM is longer than the processing time of the generation step of the LM. Therefore, in generating a token for a response, the token generation speed of the system can be improved by configuring the LM to generate as many tokens as possible and the UM to perform only selective judgment.

The number of parameters of each of the LM and the UM may be determined considering the hardware resource limitations of the device 1 (for example, the processing performance of the system on chip SoC and the bandwidth of the memory MEM of FIG. 15 or FIG. 16). The UM can utilize a language model whose number of parameters is determined considering the hardware resource limitations of the device being processed.

In some examples, the LM may be a model obtained by pruning the parameters of the UM. In this case, the parameters of the pruned neural network model can be lightweight, and the required memory bandwidth may be smaller than that of the UM.

According to the third example of the present disclosure, the device 1 may be configured to process a prefill operation using the UM to process speculative decoding. Subsequently, the device 1 may process a prefill operation and a generation operation using the LM to process speculative decoding.

The device 1 according to the third example of the present disclosure may include at least one interface (not shown). The interface can input and/or output data. The device 1 can receive an input query through the interface (not shown). The interface may be an electronic circuit capable of receiving an input query such as a prompt, a gesture, a voice, and the like. The input and/or output interface may include, for example, a mouse, a keyboard, a touch pad, a touch screen, a microphone, a wireless communication device, a wired communication device, a camera, a speaker, and the like.

The system on chip SoC of the device 1 according to the third example of the present disclosure can perform inference operations on the UM and the LM. The UM and the LM can cooperate with each other to process speculative decoding. The NPU of the system on chip SoC of the device 1 according to the third example of the present disclosure can process the UM and the LM alternately. That is, the NPU operates to sequentially process the UM and the LM. In other words, the NPU operates to process the UM and the LM in a time-division manner. Therefore, the utilization rate of the operation circuits of the NPU can be increased while sequentially processing the UM and the LM.

According to the disclosed embodiment, speculative decoding is performed by sequentially processing the UM and the LM in the NPU of the device 1, and the bottleneck phenomenon caused by the speculative decoding operation can be reduced by having the parameters of the UM and the LM reside in the memory MEM.

The memory MEM of the device 1 according to the third example of the present disclosure is configured to store all the weight values of the UM and the LM when the device 1 operates. By storing all the first weight values of the UM and the second weight values of the LM in the memory MEM, the device 1 can efficiently process speculative decoding. The memory MEM of the device 1 according to the third example of the present disclosure can provide the parameters of the UM to the NPU when the NPU infers the UM, and provide the parameters of the LM to the NPU when it infers the LM.

For example, when performing a speculative decoding operation, the device 1 can allocate a memory bank where the weight values of the UM and the LM will be stored by setting the address map of the memory MEM. Therefore, during a speculative decoding operation, all the weight values of the UM and the LM can reside in the memory MEM. That is, the capacity of the memory MEM of the device 1 according to the third example of the present disclosure may be larger than the total capacity occupied by the first weight values of the UM and the second weight values of the LM. If the memory MEM of the device 1 does not have the memory capacity to store the UM and the LM, it may be difficult to quickly process speculative decoding in real time. That is, the capacity of the memory MEM may be determined considering the size of the parameters of the UM and the LM to be driven in the device 1. If not all the parameters of the UM and the LM are stored in the memory MEM, a conventional device has to read the weight values of each model from an external storage device for speculative decoding. In this embodiment, the conventional device has to command unnecessary memory read and memory write operations for speculative decoding, so the token generation speed may be lower than the token generation speed of the device 1 according to the third example of the present disclosure.

The first memory of the device 1 according to the second embodiment of the first example of the present disclosure is configured to store the weight values of the UM and the tokens generated by the UM when the device 1 operates.

The second memory of the device 1 according to the second embodiment of the first example of the present disclosure is configured to store the weight values of the LM and the tokens generated by the LM when the device 1 operates. If all the weight values of the UM and the LM are stored in The first memory and the second memory, the device 1 can efficiently process speculative decoding. To elaborate, the size of the weight values of the UM and the LM can be quite large, and it may be difficult to store them all in one memory chip. In this case, the device 1 can increase the capacity of the memory by configuring a plurality of memories.

The first memory of the device 1 according to the second embodiment of the first example of the present disclosure is configured to provide the parameters of the UM to the NPU when the NPU infers the UM, and The second memory is configured to provide the parameters of the LM to the NPU when it infers the LM.

For example, when performing a speculative decoding operation, the device 1 can allocate a memory bank where the weight values of the UM and the LM will be stored by setting the address map of each of The first memory and the second memory. Therefore, during a speculative decoding operation, all the weight values of the UM and the LM can reside in both The first memory and the second memory.

Accordingly, the capacity of the plurality of memories (the first memory, the second memory) of the device 1 according to the second embodiment of the first example of the present disclosure is configured to be larger than the total capacity occupied by the weight values of the UM and the LM. Therefore, the weight values of the UM and the LM can reside in the plurality of memories (the first memory, the second memory). If the capacity of the plurality of memories (the first memory, the second memory) of the device 1 is insufficient for the UM and the LM, it may be difficult to efficiently process speculative decoding.

If not all the parameters of the UM and the LM are stored in the plurality of memories (the first memory, the second memory), a conventional device has to read the weight values of each model from an external storage device for speculative decoding. Accordingly, the conventional device commands unnecessary memory read and memory write operations for speculative decoding. Accordingly, the token generation speed of the conventional device becomes lower than the token generation speed of the device 1 according to the second embodiment of the first example of the present disclosure.

Figure 19:
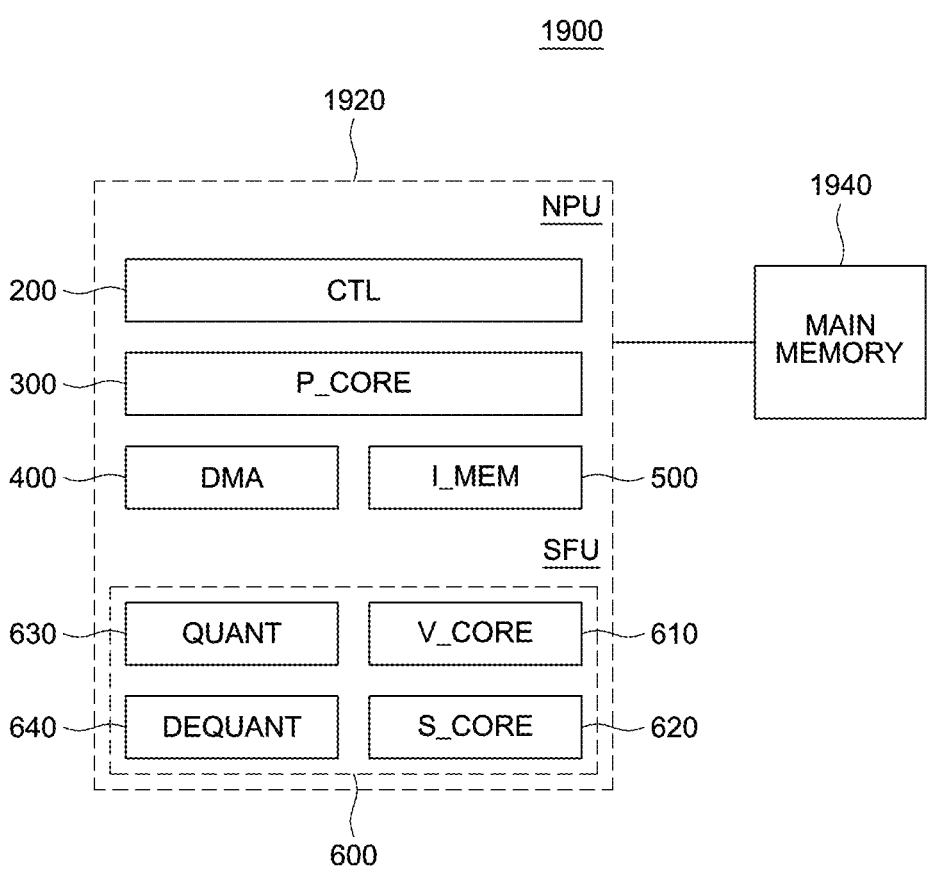
FIG. 19 is a block diagram illustrating an electronic device for processing a language model in an on-device manner, according to an embodiment.

FIG. 19 illustrates an electronic device 1900 for processing a language model in an on-device manner, according to an embodiment.

Referring to FIG. 19, the electronic device 1900 may include a wide variety of platforms, such as a mobile device including a smartphone or smartwatch, a home appliance, a drone, a camera, a robot, a vehicle, a laptop, a desktop computer, an Internet of Things (IoT) node, an artificial intelligence assistant, or a smart mobility platform, but is not limited thereto. A user can input a voice signal or text data to the electronic device 1900, and the device can execute an inference operation using a large language model (LLM) to generate a response or answer. This operation has been described above with reference to FIG. 1 and FIG. 2. In this embodiment, the inference is performed in an on-device manner—meaning that the computation and model execution occur entirely within the electronic device without requiring data transmission to an external server—thereby reducing latency, preserving privacy, and enabling offline functionality.

The electronic device 1900 may include a neural processing unit (NPU) 1920 and a main memory 1940. According to an embodiment, the electronic device 1900 may also include a CPU (not shown) for control and coordination, or a GPU (not shown) for parallel computation of large matrix operations. Since the NPU 1920 of FIG. 19 corresponds functionally to the NPU 100 described above with reference to FIG. 3 to FIG. 18, the same architectural and operational descriptions provided for the NPU 100 apply equally to the NPU 1920 of FIG. 19.

The main memory 1940 may store all data necessary for the execution of the compiled large language model, including both static parameters and temporary inference buffers. An artificial neural network designed for LLM inference may be compiled into a format optimized for the target hardware, and this compiled representation can be stored in the memory. Compilation may be performed by a CPU (not shown) within the electronic device 1900, but may also be performed offline and then deployed to the device as a binary model package.

The main memory 1940 may store weight values of the LLM, including query, key, and value weight matrices for the attention mechanism, as well as feedforward network (FFN) weights, layer normalization parameters, and embedding matrices. Depending on the scale of the LLM, these weights can occupy from several hundred megabytes to many tens of gigabytes. For example, Meta's LLaMA 7B model has a footprint of approximately 13 GB in 16-bit format, and OpenAI's GPT-3.5 based ChatGPT models are known to require several tens of gigabytes of parameters in their uncompressed form.

While the main memory 1940 is typically implemented with dynamic random-access memory (DRAM), it is not limited thereto and may be implemented with SRAM, high-bandwidth memory (HBM), or certain non-volatile memory technologies. For mobile on-device inference, a compact and energy-efficient memory configuration is desirable, such that a low-power DRAM device such as LPDDR5 may be employed as the main memory 1940.

As a representative configuration, the main memory 1940 may be implemented as an 8 GB low-power double data rate 5 (LPDDR5) memory. LPDDR5 offers high-speed data transfer with low power consumption, making it suitable for storing and streaming large quantities of LLM parameters during inference. With compression and quantization—such as 4-bit or 8-bit weight representations—an 8 GB memory can store and execute LLMs in the several-billion to low-tens-of-billions parameter range, while maintaining responsive performance on a mobile platform. In some embodiments, LPDDR6 may be used as a higher-performance successor technology.

If the available memory is less than 8 GB, the maximum size of the mountable LLM is significantly constrained, often leading to degraded language comprehension and generation quality. Conversely, providing more than 8 GB enables larger model execution but can increase power draw, thermal output, and physical footprint, all of which are critical constraints in mobile device design.

An 8 GB LPDDR5 memory provides sufficient bandwidth and capacity to store quantized LLM weights while accommodating intermediate results such as activation maps, attention caches, and beam search buffers for real-time inference. Its high throughput enables rapid fetching of large weight blocks into the NPU, while its low idle power characteristics extend battery life. Maintaining memory capacity near the minimum needed avoids unnecessary power waste and simplifies integration into existing mobile product designs without significant hardware redesign.

The weight values of the LLM may be pre-quantized and stored in the main memory 1940 to improve memory efficiency. Quantization can be performed at model compilation, where higher-precision formats such as 32-bit or 16-bit floating point are converted to compact fixed-point representations, e.g., 8-bit integers. This can reduce weight storage requirements by a factor of four in the case of 32-bit to 8-bit conversion. Additional techniques such as parameter compression, dynamic weight loading, and scheduled inference execution can be applied to achieve high throughput in LPDDR5 configurations of 8 GB or less.

The weight value stored in the main memory 1940 can be quantized as one of the tensor values of the weight values $(X_1, X_2, \ldots, X_k)$. For example, for a set of weights values $X_1, X_2, \ldots, X_k$ constituting the large language model, an absolute value $|X|$ is computed for each of at least a subset (partial set) of the weight values. The maximum among the obtained absolute values is divided by $(2^{N-1})-1$, where N is an integer equal to the number of representation bits supported by the processing core 300, to obtain a first scale value s1 as in the following Equation 6.

Equation 6

$$s1 = \frac{\max(|X|)}{\left(2^{N-1}\right) - 1}$$

According to the following Equation 7, a quantized weight value $X_q$ can be obtained by multiplying the weight value before quantization by the reciprocal of the first scale value. A rounding operation (round) and a clipping operation (clip) are operations for putting a value outside a range into a predetermined range.

Equation 7

$$X_q = \text{Clip}\left(\text{round}\left(\frac{X}{s1}\right)\right)$$

The processing core 300 performs a matrix multiplication between the embedding vector of the text and the weight matrix under an N-bit integer representation system. When the weight value stored in the main memory 1940 is quantized to an 8-bit integer, N becomes 8 in Equation 6.

The quantization of the weight value may be performed during the compilation stage, and the weight tensor may include the entire artificial neural network model or only a portion thereof, such as a per-channel weight set or a per-tile weight set. For example, if $d_{model}$ is 4,096, 4,096 weight values may be grouped as one set for quantization. According to an embodiment, the quantized weight values may be divided into tiles and delivered to the processing core 300. A tile may correspond to an operation unit processed in parallel by multiple processing elements included in the processing core 300, with the number and structure of tiles determined at compilation.

If the scale value is calculated for each tile unit from which the processing core reads data for parallel operations, the local value distribution can be more precisely reflected while maintaining the memory overhead and management complexity of the scale values at a reasonable level.

Thus, the first scale value (s1) in Equation 6 may be calculated on a per-channel basis of the artificial neural network or on a per-tile basis corresponding to the parallel operation unit of the processing core 300.

The processing core 300 of the NPU 1920 may perform inference operations on text data based on a large language model. The embedding vector may be generated by a CPU or a GPU outside the NPU 1920 and delivered to the NPU 1920 for subsequent inference. The NPU 1920 may execute inference of a transformer-based generative artificial intelligence model.

The embedding vector may pass through an attention layer, a feed-forward network layer, and other layers based on an attention mechanism. According to an embodiment, during inference based on an attention mechanism, both the embedding vector and the activation parameters generated within the neural network layer may be quantized.

Figure 20:
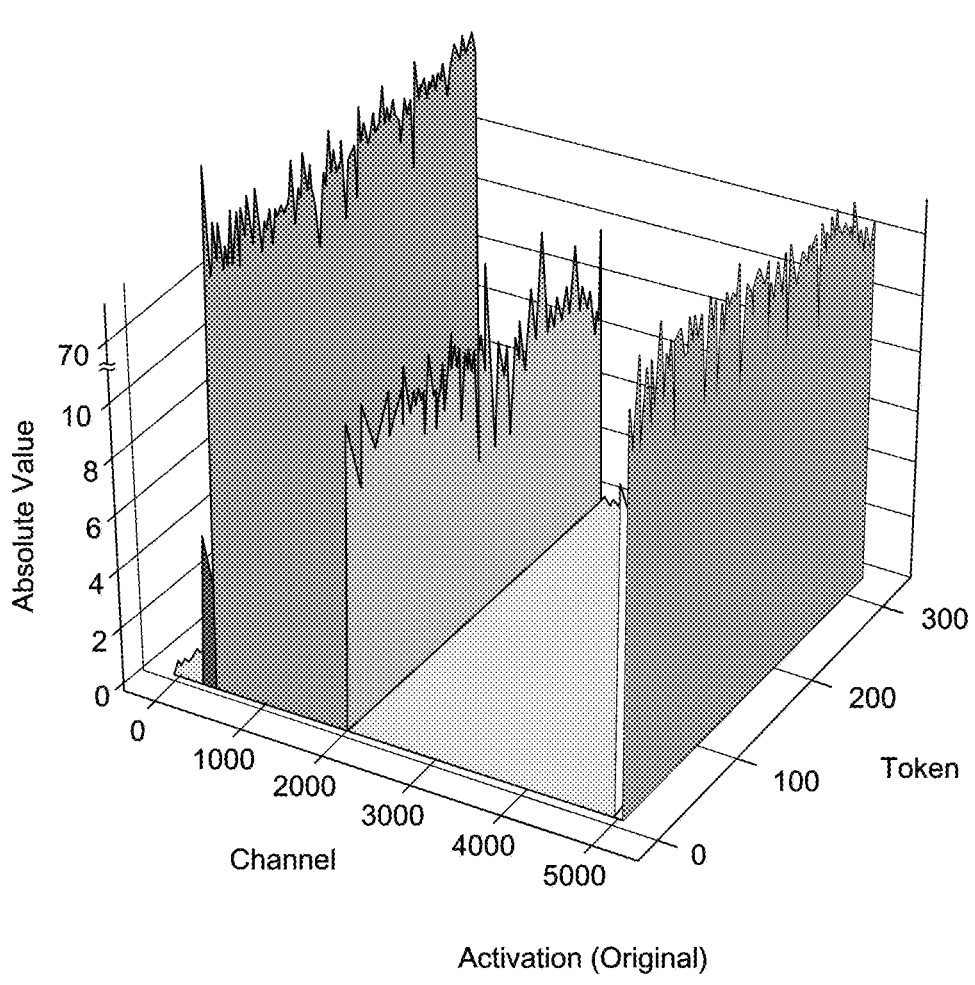
FIG. 20 is a three-dimensional graph illustrating a distribution of activation values, according to an embodiment.

However, the scale value for quantizing the embedding vector and activation parameters does not directly apply the scale value used for weight quantization. Instead, the scale value may be dynamically determined according to the actual range of activation values obtained at runtime. Referring to FIG. 20, the values of activation parameters in a large language model or transformer-based model exhibit significant outliers, with wide variations in range between tokens and channels. Thus, the scale value is adjusted dynamically during inference, since activation values are generated at runtime rather than at compilation.

The quantization of activation values may be performed in the special function unit 600. The quantization unit 630 may convert a 32-bit or 16-bit floating-point value to an 8-bit integer value, while the dequantization unit 640 may restore an integer value to a 32-bit or 16-bit floating-point form.

According to an embodiment, in the electronic device 1900, the matrix multiplication operation may be performed in the processing core 300 of the NPU 1920 using INT8 or INT4 data. In contrast, operations such as RMS normalization and softmax may be performed in the special function unit 600 in FP32 or FP16 format. Quantization and dequantization are performed to enable data exchange between these units.

Although the quantization unit 630, vector core 610, dequantization unit 640, and scalar core 620 are shown separately in FIG. 19, this is a functional separation, and portions of these modules may be implemented in an integrated manner. For example, the quantization unit 630 may be implemented using a first portion of the vector core 610 and scalar core 620, while the dequantization unit 640 may be implemented using a second portion thereof. The special function unit 600 may include multiple circuit modules exclusively for mathematical operations required by the attention mechanism, with some modules performing quantization and others performing dequantization.

Since the activation values of a large language model are generated at runtime, a scale value based on the distribution of the corresponding values may be determined during runtime. For example, when a 5×4096 embedding vector is input to a neural network layer for an attention mechanism, the output of that layer generates a 5×4096 activation tensor. A scale value for dynamic quantization may then be calculated based on the distribution of this tensor, and the quantization unit 630 may perform quantization using Equations 8 and 9.

The activation value can be quantized as one of the tensor values of the activation values ($Y_1$, $Y_2$, . . . , $Y_k$). For example, for a set of activation values $Y_1, Y_2, \ldots, Y_k$ output through the artificial neural network, an absolute value $|Y|$ is computed for each of at least a subset (partial set) of the activation values. The maximum of these absolute values is divided by $(2^{N-1})-1$, where N is an integer equal to the number of representation bits supported by the processing core 300, to obtain a second scale value s2 as in Equation 8.

Equation 8

$$s2 = \frac{\max(|Y|)}{(2^{N-1}) - 1}$$

According to the following Equation 9, a quantized activation value $Y_q$ can be obtained by multiplying the activation value before quantization by the reciprocal of the second scale value. A rounding operation (round) and a clipping operation (clip) are operations for putting a value outside a range into a predetermined range.

Equation 9

$$Y_q = \text{Clip}\left(\text{round}\left(\frac{Y}{s2}\right)\right)$$

According to an embodiment, a value obtained by adding epsilon (ε) to s2 may be used in the denominator as in Equation 10 below. This is to prevent the value of Yq from approaching infinity when the denominator is close to zero. Epsilon (ε) may be $2^{-5}$, but is not limited thereto.

Equation 10

$$Y_q = \text{Clip}\left(\text{round}\left(\left(\frac{y}{s2 + \varepsilon}\right)\right)\right)$$

The second scale value (s2) in Equation 8 may be calculated on a per-channel basis of the artificial neural network or on a per-tile basis, which is a parallel operation unit of the processing core 300. The unit set of activation values for obtaining the second scale value (s2) may include the entire artificial neural network model or a part thereof (for example, a per-channel activation value set, a per-tile activation value set). For example, if $d_{model}$ is 4,096, 4,096 weight values may be determined as one set for quantization. Alternatively, a tile unit processed in parallel by a plurality of processing elements in the processing core 300 may be a unit set for calculating the second scale value (s2).

The dequantization unit 640 can convert a quantized value back into a more precise floating-point value by de-quantizing it. Dequantization may be performed to increase the precision of a value in an integer form received from the processing core 300 and utilize it for the operation of the special function unit 600. Equation 11 is a formula for dequantization.

Equation 11

$$\text{dequantize}(x)$$
$$= x \cdot \text{weight\_dequant\_scale} \cdot \text{actication\_dequant\_scale}$$

In Equation 11, x may be a quantized value (for example, an 8-bit integer value), weight_dequant_scale may be the first scale value (s1) used when quantizing the weights, and activation_dequant_scale may be the second scale value (s2) used when quantizing the activation values.

The electronic device 1900 may further include a non-volatile memory (not shown) for storing a large language model. The non-volatile memory may include NAND flash memory, eMMC (embedded multimedia card), UFS (universal flash storage), NOR Flash, MRAM, ReRAM, FRAM, and the like. The text input by the user and the inference result may be stored together in the non-volatile memory. The text and the inference result may be encrypted and stored with a unique key unique to the electronic device 1900. In this embodiment, since the text and the inference result are encrypted and stored using hardware identification information such as the serial number of the electronic device 1900, the text and the inference result cannot be restored outside the electronic device 1900, which is consistent with the on-device language model function and can enhance security.

The electronic device 1900 may further include a microphone for receiving a voice signal from a user, a speech recognition module for converting the voice signal into text, and a speaker for letting the user hear the inference result.

The descriptions are intended to provide exemplary configurations and operations for implementing the present invention. The technical spirit of the present invention will include not only the embodiments described above, but also implementations that can be obtained by simply changing or modifying the above embodiments. In addition, the technical spirit of the present invention will also include implementations that can be easily changed or modified in the future from the embodiments described above.

[National R&D Project Supporting This Invention]
[Project Identification Number] 2710008599
[Task Number] II220957
[Name of Ministry] Ministry of Science and ICT
[Name of Task Management (Specialized) Institution] Institute of Information & Communications Technology Planning & Evaluation
[Research Project Title] PIM AI Semiconductor Core Technology Development (Design)
[Research Task Name] Development of Distributed On-Chip Memory-Processor Integrated PIM Semiconductor Technology for Edge Applications
[Name of the organization performing the task] DEEPX CO., LTD.
[Research Period] 2024 Jan. 1~2024 Dec. 31

What is claimed is:
1. A mobile electronic device comprising:
a main memory for storing compiled and quantized weight values of a large language model, the compiled and quantized weight values including weight values of at least one artificial neural network;

a processing core for performing an inference operation based on an attention mechanism on text based on the large language model;

a controller for controlling the operation of the processing core and the main s memory and for scheduling the inference operation; and a special function unit (SFU) for performing vector operations and scalar operations necessary for the inference operation, wherein the main memory stores the compiled and quantized weight values as the weight values of the at least one artificial neural network corresponding to a weight matrix including a query weight matrix, a key weight matrix, or a value weight matrix for performing the attention mechanism, the weight is values of the at least one artificial neural network being pre-quantized when the at least one artificial neural network is compiled, wherein the processing core performs a matrix multiplication operation on an is embedding vector of the text with the weight matrix under an N-bit integer system supported by the processing core, wherein the special function unit includes a quantizer for converting a value in a floating-point format to an integer format and a dequantizer for converting a value in an integer format to a floating-point format, wherein the compiled and quantized weight values are quantized based on a first scale value determined when the at least one artificial neural network is compiled and are prepared on the main memory before the inference operation, and wherein, during the inference operation, quantization for activation values is performed based on a second scale value determined based on a range of activation values output from the at least one artificial neural network.

2. The mobile electronic device of claim 1, wherein an absolute value is taken for each of at least a partial set of the compiled and quantized weight values constituting the large language model, a maximum value among the obtained absolute values divided by $(2^{N-1})-1$ to obtain the first scale value, and wherein a quantized value is obtained by multiplying the weight value in floating-point format by the reciprocal of the first scale value.

3. The mobile electronic device of claim 1, wherein the first scale value is calculated on a per-channel basis of the at least one artificial neural network.

4. The mobile electronic device of claim 1, wherein an absolute value is taken for each of at least a partial set of activation values obtained during the inference operation, a maximum value among the obtained absolute values divided by $(2^{N-1})-1$ to obtain the second scale value, and wherein a quantized value is obtained by multiplying the activation value in floating-point format by the reciprocal of the second scale value.

5. The mobile electronic device of claim 1, wherein the second scale value is calculated on a per-channel basis of the at least one artificial neural network.

6. The mobile electronic device of claim 1, wherein the processing core, the controller, and the special function unit are included in a neural processing unit (NPU), and the main memory is located outside the NPU, and wherein the matrix multiplication operation is performed in the processing core under the N-bit integer system, and a softmax operation is performed in the special function unit under an M-bit floating-point system, where M is an integer greater than N.

7. The mobile electronic device of claim 1, wherein the dequantizer obtains a floating-point value by multiplying a quantized value by the first scale value to obtain a product and multiplying the product by the second scale value.

8. The mobile electronic device of claim 1, further comprising:

a non-volatile memory for storing the large language model, wherein the text and the inference result are stored in the non-volatile memory.

9. The mobile electronic device of claim 1, further comprising:

a microphone for receiving a voice signal from a user;

a speech recognition module for converting the voice signal into the text; and a speaker for outputting the inference result.

10. The mobile electronic device of claim 1, wherein the main memory is an LPDDR5 with a capacity of 8 GB.

\* \* \* \* \*